US008222313B2

(12) United States Patent
Iftime et al.

(10) Patent No.: US 8,222,313 B2
(45) Date of Patent: Jul. 17, 2012

(54) RADIATION CURABLE INK CONTAINING FLUORESCENT NANOPARTICLES

(75) Inventors: Gabriel Iftime, Mississauga (CA); C. Geoffrey Allen, Waterdown (CA); Maria M. Birau, Mississauga (CA); Christopher A. Wagner, Etobicoke (CA); Daryl W. Vanbesien, Burlington (CA); Jordan H. Wosnick, Toronto (CA); Peter G. Odell, Mississauga (CA)

(73) Assignee: Xerox Corporation, Norwalk, CT (US)

( * ) Notice: Subject to any disclaimer, the term of this patent is extended or adjusted under 35 U.S.C. 154(b) by 801 days.

(21) Appl. No.: 12/245,782

(22) Filed: Oct. 6, 2008

(65) Prior Publication Data

US 2010/0086701 A1 Apr. 8, 2010

(51) Int. Cl.
*C08F 2/46* (2006.01)
*C08J 3/28* (2006.01)
*C09D 11/00* (2006.01)
*C09D 11/10* (2006.01)

(52) U.S. Cl. ............ 522/75; 522/74; 522/71; 522/113; 522/114; 522/121; 522/178; 522/104; 522/107; 522/150; 522/153; 522/182; 522/909; 106/31.13; 106/31.6; 524/157; 524/301; 524/302; 524/306; 524/315; 523/161; 523/160

(58) Field of Classification Search ............... 522/75, 522/74, 71, 113, 114, 121, 104, 107, 150, 522/153, 178, 182, 909; 106/31.13, 31.6; 524/157, 301, 302, 306, 315; 523/161, 160
See application file for complete search history.

(56) References Cited

U.S. PATENT DOCUMENTS

| 2,809,954 A | 10/1957 | Kazenas |
| 2,938,873 A | 5/1960 | Kazenas |
| 3,455,856 A | 7/1969 | Voedisch et al. |
| 3,590,000 A | 6/1971 | Palermiti et al. |
| 3,642,650 A | 2/1972 | McIntosh |
| 3,800,588 A | 4/1974 | Larson et al. |
| 3,847,604 A | 11/1974 | Hagenbach et al. |
| 3,944,493 A | 3/1976 | Jadwin et al. |
| 4,007,293 A | 2/1977 | Mincer et al. |
| 4,079,014 A | 3/1978 | Burness et al. |
| 4,291,111 A | 9/1981 | Lu |
| 4,338,390 A | 7/1982 | Lu |
| 4,394,430 A | 7/1983 | Jadwin et al. |
| 4,560,635 A | 12/1985 | Hoffend et al. |
| 4,714,682 A | 12/1987 | Schwartz |
| 4,830,671 A | 5/1989 | Frihart et al. |
| 4,889,560 A | 12/1989 | Jaeger et al. |
| 4,889,761 A | 12/1989 | Titterington et al. |
| 4,935,326 A | 6/1990 | Creatura et al. |
| 4,937,166 A | 6/1990 | Creatura et al. |
| 4,975,220 A | 12/1990 | Streitel et al. |
| 5,073,498 A | 12/1991 | Schwartz et al. |
| 5,093,147 A | 3/1992 | Andrus et al. |
| 5,094,777 A | 3/1992 | DiPietro |
| 5,194,638 A | 3/1993 | Frihart et al. |
| 5,221,335 A | 6/1993 | Williams et al. |
| 5,264,153 A | 11/1993 | De Krom |
| 5,278,020 A | 1/1994 | Grushkin et al. |
| 5,290,664 A | 3/1994 | Matsumoto |
| 5,294,664 A | 3/1994 | Morrison, Jr. et al. |
| 5,308,734 A | 5/1994 | Sacripante et al. |
| 5,344,738 A | 9/1994 | Kmiecik-Lawrynowicz et al. |
| 5,346,797 A | 9/1994 | Kmiecik-Lawrynowicz et al. |
| 5,348,832 A | 9/1994 | Sacripante et al. |
| 5,364,729 A | 11/1994 | Kmiecik-Lawrynowicz et al. |
| 5,366,841 A | 11/1994 | Patel et al. |
| 5,370,963 A | 12/1994 | Patel et al. |
| 5,372,852 A | 12/1994 | Titterington et al. |
| 5,403,693 A | 4/1995 | Patel et al. |
| 5,405,728 A | 4/1995 | Hopper et al. |
| 5,418,108 A | 5/1995 | Kmiecik-Lawrynowicz et al. |
| 5,435,937 A | 7/1995 | Bell et al. |
| 5,439,971 A | 8/1995 | Hyche |
| 5,496,676 A | 3/1996 | Croucher et al. |
| 5,501,935 A | 3/1996 | Patel et al. |
| 5,527,658 A | 6/1996 | Hopper et al. |
| 5,529,876 A | 6/1996 | Sasaki et al. |
| 5,554,480 A | 9/1996 | Patel et al. |
| 5,585,215 A | 12/1996 | Ong et al. |

(Continued)

FOREIGN PATENT DOCUMENTS

EP 0 463 260 A1 1/1992

(Continued)

OTHER PUBLICATIONS

U.S. Appl. No. 12/245,824, filed Oct. 6, 2008, Maria Birau et al.
U.S. Appl. No. 12/245,820, filed Oct. 6, 2008, Gabriel Iftime et al.
U.S. Appl. No. 12/246,175, filed Oct. 6, 2008, Gabriel Iftime et al.
U.S. Appl. No. 12/246,120, filed Oct. 6, 2008, Maria Birau et al.
Sep. 16, 2011 Office Action issued in U.S. Appl. No. 12/246,120.
Nov. 10, 2011 Office Action issued in U.S. Appl. No. 12/245,820.
Sep. 29, 2011 Office Action issued in U.S. Appl. No. 12/246,175.
Office Action for corresponding Canadian Patent Application No. 2,680,954, mailed on May 9, 2011.

(Continued)

*Primary Examiner* — Sanza McClendon
(74) *Attorney, Agent, or Firm* — Oliff & Berridge, PLC

(57) ABSTRACT

Radiation curable compositions, such as UV curable ink compositions, contain a polymeric dispersant, a curable material, that includes a carrier and at least one nanoscale fluorescent pigment particle and an optional non-fluorescent colorant. The fluorescent organic nanoparticle composition includes one or more fluorescent dyes dispersed in a polymeric matrix obtained by modified EA latex process or by emulsion polymerization. In a different embodiment, the nanoscale fluorescent pigment particle composition includes pigment molecules with at least one functional moiety, and a sterically bulky stabilizer compound including at least one functional group, the functional moiety of the pigment associates noncovalently with the functional group of the stabilizer, and the presence of the associated stabilizer limits the extent of particle growth and aggregation, to afford nanoscale-sized pigment particles.

21 Claims, No Drawings

U.S. PATENT DOCUMENTS

| | | | |
|---|---|---|---|
| 5,593,807 | A | 1/1997 | Sacripante et al. |
| 5,597,856 | A | 1/1997 | Yu et al. |
| 5,621,022 | A | 4/1997 | Jaeger et al. |
| 5,650,255 | A | 7/1997 | Ng et al. |
| 5,650,256 | A | 7/1997 | Veregin et al. |
| 5,679,138 | A | 10/1997 | Bishop et al. |
| 5,723,253 | A | 3/1998 | Higashino et al. |
| 5,728,797 | A | 3/1998 | O'Dell et al. |
| 5,744,520 | A | 4/1998 | Kmiecik-Lawrynowicz et al. |
| 5,747,215 | A | 5/1998 | Ong et al. |
| 5,763,133 | A | 6/1998 | Ong et al. |
| 5,766,818 | A | 6/1998 | Smith et al. |
| 5,804,349 | A | 9/1998 | Ong et al. |
| 5,827,633 | A | 10/1998 | Ong et al. |
| 5,840,462 | A | 11/1998 | Foucher et al. |
| 5,853,943 | A | 12/1998 | Cheng et al. |
| 5,853,944 | A | 12/1998 | Foucher et al. |
| 5,869,215 | A | 2/1999 | Ong et al. |
| 5,869,216 | A | 2/1999 | Ong et al. |
| 5,869,558 | A | 2/1999 | Hou |
| 5,916,725 | A | 6/1999 | Patel et al. |
| 5,928,830 | A | 7/1999 | Cheng et al. |
| 5,945,245 | A | 8/1999 | Mychajlowskij et al. |
| 6,103,006 | A | 8/2000 | DiPietro |
| 6,120,967 | A | 9/2000 | Hopper et al. |
| 6,130,021 | A | 10/2000 | Patel et al. |
| 6,174,937 | B1 | 1/2001 | Banning et al. |
| 6,268,222 | B1 | 7/2001 | Chandler et al. |
| 6,294,306 | B1 | 9/2001 | Kmiecik-Lawrynowicz et al. |
| 6,309,787 | B1 | 10/2001 | Cheng |
| 6,399,713 | B1 | 6/2002 | MacQueen et al. |
| 6,413,692 | B1 | 7/2002 | Cheng |
| 6,447,974 | B1 | 9/2002 | Chen et al. |
| 6,458,501 | B1 | 10/2002 | Cheng et al. |
| 6,492,458 | B1 | 12/2002 | Pavlin |
| 6,537,364 | B2 | 3/2003 | Dietz et al. |
| 6,547,380 | B2 | 4/2003 | Smith et al. |
| 6,837,918 | B2 | 1/2005 | Pozarnsky et al. |
| 6,860,930 | B2 | 3/2005 | Wu et al. |
| 6,867,251 | B2 | 3/2005 | Wang et al. |
| 6,870,011 | B2 | 3/2005 | MacQueen et al. |
| 6,902,613 | B2 | 6/2005 | Bäbler |
| 6,906,118 | B2 | 6/2005 | Goodbrand et al. |
| 7,037,633 | B2 | 5/2006 | Hopper et al. |
| 7,160,380 | B2 | 1/2007 | Maeta et al. |
| 7,270,408 | B2 | 9/2007 | Odell et al. |
| 7,293,868 | B2 | 11/2007 | Odell et al. |
| 7,427,323 | B1 | 9/2008 | Birau et al. |
| 7,649,026 | B2 * | 1/2010 | Allen et al. ............... 522/42 |
| 7,834,072 | B2 * | 11/2010 | Carlini et al. ............. 524/157 |
| 7,897,653 | B2 * | 3/2011 | Iftime et al. ............... 522/75 |
| 2002/0131941 | A1 | 9/2002 | Habeck et al. |
| 2003/0055178 | A1 | 3/2003 | Gore et al. |
| 2003/0199608 | A1 | 10/2003 | Kamigaki et al. |
| 2004/0063848 | A1 | 4/2004 | Olson et al. |
| 2004/0261657 | A1 | 12/2004 | Wu et al. |
| 2005/0075453 | A1 | 4/2005 | Mathauer et al. |
| 2005/0186443 | A1 | 8/2005 | Marrocco, III et al. |
| 2006/0063873 | A1 | 3/2006 | Lin et al. |
| 2006/0144290 | A1 | 7/2006 | Polk et al. |
| 2006/0158491 | A1 | 7/2006 | Belelie et al. |
| 2006/0158492 | A1 | 7/2006 | Odell et al. |
| 2006/0159850 | A1 | 7/2006 | Breton et al. |
| 2006/0240353 | A1 | 10/2006 | Matsumura et al. |
| 2006/0293409 | A1 | 12/2006 | Sanchez et al. |
| 2007/0012221 | A1 | 1/2007 | Maeta et al. |
| 2007/0020542 | A1 | 1/2007 | Patel |
| 2007/0082980 | A1 | 4/2007 | Lai et al. |
| 2007/0120921 | A1 | 5/2007 | Carlini et al. |
| 2007/0120924 | A1 | 5/2007 | Odell et al. |
| 2008/0087190 | A1 | 4/2008 | Iftime et al. |
| 2008/0090928 | A1 | 4/2008 | Iftime et al. |
| 2008/0182193 | A1 | 7/2008 | Agur et al. |
| 2008/0302272 | A1 | 12/2008 | Allen et al. |
| 2008/0306189 | A1 * | 12/2008 | Carlini et al. ............. 524/95 |
| 2008/0306193 | A1 * | 12/2008 | Allen et al. ............... 524/190 |
| 2009/0155712 | A1 | 6/2009 | Sacripante et al. |
| 2009/0214972 | A1 | 8/2009 | Wosnick et al. |

FOREIGN PATENT DOCUMENTS

| | | |
|---|---|---|
| EP | 1 736 514 A1 | 12/2006 |
| GB | 1442835 | 7/1976 |
| GB | 2 238 792 A | 6/1991 |
| JP | A-2002-285058 | 10/2002 |
| JP | A-2005-238342 | 9/2005 |
| JP | A-2007-23168 | 2/2007 |
| JP | A-2007-23169 | 2/2007 |
| WO | WO 94/11446 | 5/1994 |
| WO | WO 2004/048482 | 6/2004 |
| WO | WO 2006/005521 | 1/2006 |
| WO | WO 2006/005536 | 1/2006 |
| WO | WO 2006/011467 | 2/2006 |
| WO | WO 2006/024103 | 3/2006 |
| WO | WO 2006/132443 | 12/2006 |
| WO | WO 2009/126388 A1 | 10/2009 |

OTHER PUBLICATIONS

Jun. 9, 2011 Office Action issued in U.S. Appl. No. 12/246,175.
May 12, 2010 Office Action issued in U.S. Appl. No. 12/245,824.
Jun. 29, 2010 Advisory Action issued in U.S Appl. No. 12/245,824.
May 28, 2009 Office Action issued in U.S. Appl. No. 12/245,824.
Nov. 20, 2009 Office Action issued in U.S. Appl. No. 12/245,824.
Nov. 16, 2009 Search Report issued in 09171060.8.

* cited by examiner

RADIATION CURABLE INK CONTAINING FLUORESCENT NANOPARTICLES

TECHNICAL FIELD

This disclosure is generally directed to radiation-curable, such as UV-curable, compositions containing fluorescent nanoparticles. More specifically, this disclosure is directed to radiation-curable compositions containing at least one nanoscale fluorescent pigment particle and/or at least one fluorescent organic nanoparticle, and the use of such inks in methods for forming images, particularly their use in inkjet printing.

RELATED APPLICATIONS

Disclosed in commonly assigned U.S. patent application Ser. No. 11/759,906 filed Jun. 7, 2007, is a nanoscale pigment particle composition, comprising: a quinacridone pigment including at least one functional moiety, and a sterically bulky stabilizer compound including at least one functional group, wherein the functional moiety associates non-covalently with the functional group; and the presence of the associated stabilizer limits the extent of particle growth and aggregation, to afford nanoscale-sized particles. Also disclosed is a process for preparing nanoscale quinacridone pigment particles, comprising: preparing a first solution comprising: (a) a crude quinacridone pigment including at least one functional moiety and (b) a liquid medium; preparing a second solution comprising: (a) a sterically bulky stabilizer compound having one or more functional groups that associate non-covalently with the functional moiety, and (b) a liquid medium; combining the first solution into the second solution to form a third solution and effecting a reconstitution process which forms a quinacridone pigment composition wherein the functional moiety of the pigment associates non-covalently with the functional group of the stabilizer and having nanoscale particle size. Still further is disclosed a process for preparing nanoscale quinacridone pigment particles, comprising: preparing a first solution comprising a quinacridone pigment including at least one functional moiety in an acid; preparing a second solution comprising an organic medium and a sterically bulky stabilizer compound having one or more functional groups that associate non-covalently with the functional moiety of the pigment; treating the second solution containing with the first solution; and precipitating quinacridone pigment particles from the first solution, wherein the functional moiety associates non-covalently with the functional group and the quinacridone pigment particles have a nanoscale particle size.

Disclosed in commonly assigned U.S. patent application Ser. No. 11/759,913 filed Jun. 7, 2007, is a nanoscale pigment particle composition, comprising: an organic monoazo laked pigment including at least one functional moiety, and a sterically bulky stabilizer compound including at least one functional group, wherein the functional moiety associates non-covalently with the functional group; and the presence of the associated stabilizer limits the extent of particle growth and aggregation, to afford nanoscale-sized pigment particles. Also disclosed is a process for preparing nanoscale-sized monoazo laked pigment particles, comprising: preparing a first reaction mixture comprising: (a) a diazonium salt including at least one functional moiety as a first precursor to the laked pigment and (b) a liquid medium containing diazotizing agents generated in situ from nitrous acid derivatives; and preparing a second reaction mixture comprising: (a) a coupling agent including at least one functional moiety as a second precursor to the laked pigment and (b) a sterically bulky stabilizer compound having one or more functional groups that associate non-covalently with the coupling agent; and (c) a liquid medium combining the first reaction mixture into the second reaction mixture to form a third solution and effecting a direct coupling reaction which forms a monoazo laked pigment composition wherein the functional moiety associates non-covalently with the functional group and having nanoscale particle size. Further disclosed is a process for preparing nanoscale monoazo laked pigment particles, comprising: providing a monoazo precursor dye to the monoazo laked pigment that includes at least one functional moiety; subjecting the monoazo precursor dye to an ion exchange reaction with a cation salt in the presence of a sterically bulky stabilizer compound having one or more functional groups; and precipitating the monoazo laked pigment as nanoscale particles, wherein the functional moiety of the pigment associates non-covalently with the functional group of the stabilizer and having nanoscale particle size.

Commonly assigned, U.S. patent application Ser. No. 11/187,007, filed Jul. 22, 2005, describes a toner comprising particles of a resin, a colorant, an optional wax, and a polyion coagulant, wherein said toner is prepared by an emulsion aggregation process.

Commonly assigned, U.S. patent application Ser. No. 10/606,298, filed Jun. 25, 2003, which has matured into U.S. Pat. No. 7,037,633, describes a toner process comprised of a first heating of a mixture of an aqueous colorant dispersion, an aqueous latex emulsion, and an aqueous wax dispersion in the presence of a coagulant to provide aggregates, adding a base followed by adding an organic sequestering agent, and thereafter accomplishing a second heating, and wherein said first heating is below the latex polymer glass transition temperature (Tg), and said second heating is above about the latex polymer Tg.

Commonly assigned, U.S. patent application Ser. No. 11/626,977, filed Jan. 25, 2007, describes a polyester resin emulsion comprising crosslinked polyester resin in an emulsion medium, the crosslinked polyester resin having a degree of cross linking of from about 0.1% to about 100%.

Commonly assigned, U.S. patent application Ser. No. 11/548,774, filed Oct. 12, 2006, describes an ink set comprised of at least one radiation curable fluorescent ink comprising at least one curable monomer or oligomer, optionally at least one photoinitiator, and at least one fluorescent material, wherein upon exposure to activating energy, the fluorescent material fluoresces to cause a visible change in the appearance of the ink.

Commonly assigned, U.S. patent application Ser. No. 11/548,775, filed Oct. 12, 2006, describes an ink set comprised of at least one fluorescent phase change ink comprising at least one fluorescent material, wherein upon exposure to activating energy, the fluorescent material fluoresces to cause a visible change in the appearance of the ink.

The appropriate components, for example, waxes, coagulants, resin latexes, surfactants, and colorants, and processes of the above copending applications and patents may be selected for the present disclosure in embodiments thereof. The entire disclosures of the above-mentioned applications are totally incorporated herein by reference.

REFERENCES

Suitable polymer matrices for commercially available fluorescent particles include polymers made from polycondensation of p-toluene-sulfonamide with melamine formaldehyde resins as described in U.S. Pat. Nos. 2,938,873; 2,809,954; and 5,728,797.

Polyamides matrices are described resulting from condensation of a diamine with a diacid (U.S. Pat. No. 5,094,777) or from polycarboxilic acid with aminoalcohols (U.S. Pat. No. 4,975,220), polyesters (U.S. Pat. No. 5,264,153) or copolymers of ethylene carbon monoxide (U.S. Pat. No. 5,439,971) are described.

Hu et. al. describe nanocolorants (dye dissolved in crosslinked polymer nanoparticles) fabricated by a miniemulsion polymerization process of a monomer in presence of a crosslinking agent. (Z. Hu, et. al., Dyes and Pigments 76 (2008) 173-178).

A number of fluorescent particles of a size less than 200 nm are made by the so-called staining method in order to avoid surface functionalization to provide particles that are robust against thermal or chemical degradation. U.S. Pat. No. 4,714,682 describes a method of calibrating a flow cytometer or fluorescent microscope based on a set of highly uniform microbeads (with diameter of less than 5 microns) associated with a fluorescent dye; EP 1736514 describes fluorescent nanoparticles having a diameter between about 30 nm and about 100 nm.

U.S. Pat. No. 5,073,498 describes a staining process in which swelling is performed on polymer microparticles made of polystyrene in the presence of a fluorescent dye; this process provides particles containing fluorescent dye essentially on the surface, not uniformly distributed within the particles.

U.S. Pat. No. 6,268,222 describes large microparticles (several microns) having surface fluorescent nanoparticles made by a staining method. With respect to the nanoparticles component, dye present only on the surface does not provide stability against thermal, light or chemical agents.

Active Motif Chromeon (Germany) and Sigma-Aldrich (Fluka) produce water dispersible fluorescent nanoparticles (less than 100 nm) usable for biological assays.

U.S. Pat. Nos. 3,455,856 and 3,642,650 describe methods of producing liquid-based inks having fluorescent particles less than 1 μm. The particles are dispersible in water, but not in organic solvents. No particle functionalization process is described and the particles (alkyd resins copolymerized with melamine formaldehyde) are not dispersible in organic solvents.

U.S. Pat. No. 5,294,664 describes water dispersible particles "not greater than 1 micron" obtained by emulsion polymerization of polystyrene incorporating fluorescent dye. The particles are not robust and are not dispersible in organic solvents.

BACKGROUND

A printing ink is generally formulated according to strict performance requirements demanded by the intended market application and desired properties. Whether formulated for office printing or for production printing, particular ink is expected to produce images that are robust and durable under stress conditions.

In a typical design of a piezoelectric inkjet printing device, the image is applied by jetting appropriately colored inks during four to six rotations (incremental movements) of a substrate (an image receiving member or intermediate transfer member) with respect to the ink jetting head, i.e., there is a small translation of the printhead with respect to the substrate in between each rotation. This approach simplifies the printhead design, and the small movements ensure good droplet registration. At the jet operating temperature, droplets of liquid ink are ejected from the printing device and, when the ink droplets contact the surface of the recording substrate, either directly or via an intermediate heated transfer belt or drum, they quickly solidify to form a predetermined pattern of solidified ink drops.

Hot melt inks typically used with inkjet printers have a wax based ink vehicle, e.g., a crystalline wax. Such solid inkjet inks provide vivid color images. In typical systems, these crystalline wax inks partially cool on an intermediate transfer member and are then pressed into the image receiving medium such as paper. Transfuse spreads the image droplet, providing a richer color and lower pile height. The low flow of the solid ink also prevents show through on the paper.

However, the use of crystalline waxes places limitations on the printing process. First, the printhead must be kept at about 130° C. during the print process. Moreover, when the printhead is cooled and re-warmed, the resulting contraction and expansion of the ink requires a purge cycle to achieve optimum printhead performance. Furthermore, increased mechanical robustness is desired.

While known compositions and processes are suitable for their intended purposes, a need remains for improvements in ink compositions, for example with respect to jetting temperatures and image quality.

Recently, the assignee has discovered several radiation-curable inks that achieve more robust images following curing. Reference is made to the following patent properties, each of which is incorporated herein by reference in its entirety.

(1) Co-pending application Ser. No. 11/034,850 filed Jan. 14, 2005; (2) Co-pending application Ser. No. 11/034,856 filed Jan. 14, 2005; (3) Co-pending application Ser. No. 11/034,714 filed Jan. 14, 2005; (4) Co-pending application Ser. No. 11/018,378 filed Dec. 22, 2004; and (5) Co-pending application Ser. No. 11/034,866 filed Jan. 14, 2005.

Pigments are a robust class of colorants useful in a variety of applications such as, for example, paints, plastics and inks. Dyes have typically been the colorants of choice for inkjet printing inks because they are readily soluble colorants which enable jetting of the ink. Dyes have also offered superior and brilliant color quality with an expansive color gamut for inks, when compared to conventional pigments. However, since dyes are molecularly dissolved in the ink vehicle, they are often susceptible to unwanted interactions that lead to poor ink performance, for example photooxidation from light (will lead to poor lightfastness), dye diffusion from the ink into paper or other substrates (will lead to poor image quality and showthrough), and the ability for the dye to leach into another solvent that makes contact with the image (will lead to poor water-/solvent-fastness). In certain situations, pigments are the better alternative as colorants for inkjet printing inks since they are insoluble and cannot be molecularly dissolved within the ink matrix, and therefore do not experience colorant diffusion. Pigments may often be less expensive than dyes and are also attractive colorants for use in printing inks.

Key challenges with using pigments for inkjet inks are their large particle sizes and wide particle size distribution, the combination of which may pose critical problems with reliable jetting of the ink (i.e. inkjet nozzles are easily blocked). Pigments are rarely obtained in the form of single crystal particles, but rather as large aggregates of crystals and with wide distribution of aggregate sizes. The color characteristics of the pigment aggregate may vary widely depending on the aggregate size and crystal morphology. Thus, an ideal colorant that is widely applicable in, for example, inks and toners, is one that possesses the best properties of both dyes and pigments, namely: 1) superior coloristic properties (large color gamut, brilliance, hues, vivid color); 2) color stability and durability (thermal, light, chemical and air-stable colorants); 3) minimal or no colorant migration; 4) processable colorants (easy to disperse and stabilize in a matrix); and 5) inexpensive material cost. Thus, there is a need addressed by embodiments of the present invention, for smaller nano-sized pigment particles that minimize or avoid the problems associated with conventional larger-sized pigment particles. There further remains a need for processes for making and using such improved nano-sized pigment particles as colorant materials. The present nanosized pigment particles are useful in, for example, paints, coatings and inks (e.g., inkjet printing inks) and including radiation-curable compositions for inks and coatings, and other compositions where pigments may be used such as plastics, optoelectronic imaging components, photographic components, and cosmetics among others.

U.S. Patent Application Publication No. 2005/0109240 describes a method of producing a fine particle of an organic pigment, containing the steps of: flowing a solution of an organic pigment dissolved in an alkaline or acidic aqueous medium, through a channel which provides a laminar flow; and changing a pH of the solution in the course of the laminar flow.

WO 2006/132443 A1 describes a method of producing organic pigment fine particles by allowing two or more solutions, at least one of which is an organic pigment solution in which an organic pigment is dissolved, to flow through a microchannel, the organic pigment solution flows through the microchannel in a non-laminar state. Accordingly, the contact area of solutions per unit time may be increased and the length of diffusion mixing may be shortened, and thus instantaneous mixing of solutions becomes possible. As a result, nanometer-scale monodisperse organic pigment fine particles may be produced in a stable manner.

K. Balakhishnan et al., "Effect of Side-Chain Substituents on Self-Assembly of Perylene Diimide Molecules: Morphology Control," *J. Am. Chem. Soc.*, vol. 128, p. 7390-98 (2006) describes the use of covalently-linked aliphatic side-chain substituents that were functionalized onto perylene diimide molecules so as to modulate the self-assembly of molecules and generate distinct nanoparticle morphologies (nano-belts to nano-spheres), which in turn impacted the electronic properties of the material. The side-chain substituents studied were linear dodecyl chain, and a long branched nonyldecyl chain, the latter substituent leading to the more compact, spherical nanoparticle.

WO 2006/011467 discloses a pigment, which is used, for example, in color image display devices and may form a blue pixel capable of providing a high level of bright saturation, particularly a refined pigment, which has bright hue and is excellent in pigment properties such as lightfastness, solvent resistance and heat resistance, and a process for producing the same, a pigment dispersion using the pigment, and an ink for a color filter. The pigment is a subphthalocyanine pigment that is prepared by converting subphthalocyanine of the specified formula, to a pigment, has diffraction peaks at least at diffraction angles ($2\theta$) 7.0°, 12.3°, 20.4° and 23.4° in X-ray diffraction and an average particle diameter of 120 to 20 nm.

U.S. Patent Application Publication No. 2006/0063873 discloses a process for preparing nano water paint comprising the steps of: A. modifying the chemical property on the surface of nano particles by hydroxylation for forming hydroxyl groups at high density on the surface of the nano particles; B. forming self-assembly monolayers of low surface energy compounds on the nano particles by substituting the self-assembly monolayers for the hydroxyl groups on the nano particles for disintegrating the clusters of nano particles and for forming the self-assembly monolayers homogeneously on the surface of the nano particles; and C. blending or mixing the nano particles having self-assembly monolayers formed thereon with organic paint to form nano water paint.

WO 2006/024103 discloses nanopigments prepared from organic IR dye and Na-bentonite with CEC of 95 mmole Na per 100 g of bentonite, at room temperature, by dissolving the Na-bentonite in water and mixing for 2 hours, and mixing in the dye, dissolved in ethanol, for 18 hours. The precipitate is filtered, washed three times with water/ethanol mixture, dried at 105° C. for 10 hours, and milled in a kitchen miller for 2 mins. 0.3 parts of the nanopigments were mixed to 100 parts of pulverized SPG resin and processed in an extruder with a die temperature of 190° C. to form transparent, faintly green or grey colored extrudates which were used to press film of 0.4 mm thickness at 160° C. The films were used to prepare IR-active laminated glass. Near infrared absorption spectra of the glass structures were obtained in a Perkin-Elmer Spectrophotometer.

WO 2006/005521 discloses a photoprotective composition comprising, in a physiologically acceptable medium: a) at least one aqueous phase, b) at least hydrophilic metal oxide nanoparticles, c) at least one vinylpyrrolidone homopolymer. The reference also discloses the use of at least one vinylpyrrolidone homopolymer in a photoprotective composition comprising at least one aqueous phase and at least hydrophilic metal oxide nanoparticles for the purpose of reducing the whitening and/or of improving the stability of the said composition. (dispersibility of the nanoparticles in the aqueous phase).

WO 2006/005536 discloses a method for producing nanoparticles, in particular, pigment particles. Said method consists of the following steps: (i) a raw substance is passed into the gas phase, (ii) particles are produced by cooling or reacting the gaseous raw substance and (iii) an electrical charge is applied to the particles during the production of the particles in step (ii), in a device for producing nanoparticles. The disclosure further relates to a device for producing nanoparticles, comprising a supply line, which is used to transport the gas flow into the device, a particle producing and charging area in order to produce and charge nanoparticles at essentially the same time, and an evacuation line which is used to transport the charged nanoparticles from the particle producing and charging area.

Japanese Patent Application Publication No. JP 2005238342 A2 discloses irradiating ultrashort pulsed laser to organic bulk crystals dispersed in poor solvents to induce ablation by nonlinear absorption for crushing the crystals and recovering the resulting dispersions of scattered particles. The particles with average size approximately 10 nm are obtained without dispersants or grinding agents for contamination prevention and are suitable for pigments, pharmaceuticals, etc.

U.S. Patent Application Publication No. 2003/0199608 discloses a functional material comprising fine coloring particles having an average primary particle diameter of 1 to 50 nm in a dried state, and having a BET specific surface area value of 30 to 500 m.sup.2/g and a light transmittance of not less than 80%. The functional material composed of fine coloring particles, exhibits not only an excellent transparency but also a high tinting strength and a clear hue.

U.S. Pat. No. 6,837,918 discloses a process and apparatus that collects pigment nanoparticles by forming a vapor of a pigment that is solid at room temperature, the vapor of the pigment being provided in an inert gaseous carrying medium. At least some of the pigment is solidified within the gaseous stream. The gaseous stream and pigment material is moved in a gaseous carrying environment into or through a dry mechanical pumping system. While the particles are within the dry mechanical pumping system or after the nanoparticles have moved through the dry pumping system, the pigment material and nanoparticles are contacted with an inert liquid collecting medium.

U.S. Pat. No. 6,537,364 discloses a process for the fine division of pigments which comprises dissolving coarsely crystalline crude pigments in a solvent and precipitating them with a liquid precipitation medium by spraying the pigment solution and the precipitation medium through nozzles to a point of conjoint collision in a reactor chamber enclosed by a housing in a microjet reactor, a gas or an evaporating liquid being passed into the reactor chamber through an opening in the housing for the purpose of maintaining a gas atmosphere in the reactor chamber, and the resulting pigment suspension and the gas or the evaporated liquid being removed from the reactor through a further opening in the housing by means of overpressure on the gas entry side or underpressure on the product and gas exit side.

U.S. Pat. No. 5,679,138 discloses a process for making inkjet inks, comprising the steps of: (A) providing an organic pigment dispersion containing a pigment, a carrier for the pigment and a dispersant; (B) mixing the pigment dispersion with rigid milling media having an average particle size less than 100 μm; (C) introducing the mixture of step (B) into a high speed mill; (D) milling the mixture from step (C) until a pigment particle size distribution is obtained wherein 90% by weight of the pigment particles have a size less than 100 nanometers (nm); (E) separating the milling media from the mixture milled in step (D); and (F) diluting the mixture from step (E) to obtain an inkjet ink having a pigment concentration suitable for inkjet printers.

Japanese Patent Application Publications Nos. JP 2007023168 and JP 2007023169 discloses providing a pigment dispersion compound excellent in dispersibility and flowability used for the color filter which has high contrast and weatherability. The solution of the organic material, for example, the organic pigment, dissolved in a good solvent under the existence of alkali soluble binder (A) which has an acidic group, and a poor solvent which makes the phase change to the solvent are mixed. The pigment nanoparticles dispersed compound re-decentralized in the organic solvent containing the alkali soluble binder (B) which concentrates the organic pigment nanoparticles which formed the organic pigment as the particles of particle size less than 1 μm, and further has the acidic group.

Kazuyuki Hayashi et al., "Uniformed nano-downsizing of organic pigments through core-shell structuring," Journal of Materials Chemistry, 17 (6), 527-530 (2007) discloses that mechanical dry milling of organic pigments in the presence of mono-dispersed silica nanoparticles gave core-shell hybrid pigments with uniform size and shape reflecting those of the inorganic particles, in striking contrast to conventional milling as a breakdown process, which results in limited size reduction and wide size distribution.

U.S. Patent Application Publication No. 2007/0012221 describes a method of producing an organic pigment dispersion liquid, which has the steps of: providing an alkaline or acidic solution with an organic pigment dissolved therein and an aqueous medium, wherein a polymerizable compound is contained in at least one of the organic pigment solution and the aqueous medium; mixing the organic pigment solution and the aqueous medium; and thereby forming the pigment as fine particles; then polymerizing the polymerizable compound to form a polymer immobile from the pigment fine particles.

The appropriate components and process aspects of each of the foregoing may be selected for the present disclosure in embodiments thereof and the entire disclosure of the above-mentioned references are totally incorporated herein by reference.

Fluorescent inks and toners are among the most widely used security printing features. A printed document is usually authenticated by detecting the light emitted by the fluorescent component when subjected to black light. The light emitting property cannot be reproduced in a second generation copy.

Fluorescent dyes used in fluorescent inks and toners can lose fluorescence in the print-head when the ink is heated to a temperature greater than 120° C. to melt during normal operation. To overcome this problem, the security printing industry uses hard, robust pigments containing the dye of interest. Pigments are preferred over fluorescent dyes because of their improved chemical, light fastening and thermal stability. Pigments are also preferred by the industry because there is limited or no migration or bleeding of the dye compound.

Most commercially available fluorescent pigments are made by grinding a bulk polymer matrix containing fluorescent materials. This process does not result in fluorescent particles of a size smaller than 1-2 microns, and typically the size of these particles is about 4-5 microns. According to this process, fluorescent dyes are incorporated into hard, crosslinked particles, thereby limiting the mobility of the fluorescent dye. Once the fluorescent dye is isolated from interaction with other materials present in the ink and, chemical degradation by the environment is diminished. These hard particles are dispersed in the marking material, typically liquid inks.

Inks based on fluorescent pigments are currently used in rotogravure, flexographic, silk-screening and off-set printing systems. However, given their large size, inks based on these pigments cannot be used with inkjet, solid ink or UV curable inks, because they physically clog the inkjet nozzles.

Thus, there is a need for fluorescent compositions, including fluorescent compositions that may be used in/with inkjet inks, solid inks, UV curable inks and EA (Emulsion Aggregation) toners and that have suitable thermal degradation properties. There is a further need for fluorescent compositions of such small size that may be used in/with inkjet inks, solid inks, UV curable inks and EA toners that are compatible with organic based marking materials.

The present disclosure addresses these needs by providing UV curable inks, particularly radiation curable compositions containing at least one nanoscale fluorescent pigment particle and/or at least one fluorescent organic nanoparticle, and the use of such inks in methods for forming images, particularly their use in inkjet printing.

SUMMARY

The present disclosure addresses these and other needs, by providing fluorescent nanoparticle compositions, and radiation-curable compositions comprising such fluorescent nanoparticle compositions.

In an embodiment, the disclosure provides a method of forming an image, comprising melting a radiation curable phase change ink comprising:

a radiation curable material, a polymeric dispersant, an optional non-fluorescent colorant including pigment, dye, mixtures of dyes, mixtures of pigments, mixtures of dyes and pigments, and the like, and a fluorescent nanoparticle, further comprising:
a fluorescent nanoparticle composition;
jetting the radiation curable phase change ink onto an image receiving substrate, wherein the radiation curable phase change ink forms a gel state;
exposing the radiation curable phase change ink on the image receiving substrate to ultraviolet light to cure the curable components of the radiation curable phase change ink.

In an embodiment, the disclosure provides radiation curable ink composition comprising:
a radiation curable material,
a polymeric dispersant,
an optional non-fluorescent colorant including pigment, dye, mixtures of dyes, mixtures of pigments, mixtures of dyes and pigments, and the like, and
a fluorescent nanoparticle, further comprising:
a fluorescent nanoparticle composition.

In another embodiment, the disclosure provides ink compositions, such as radiation-curable ink compositions, generally comprising at least a curable carrier material, a polymeric dispersant, and the above nanoscale pigment particle composition.

Also disclosed herein are ink compositions comprising the fluorescent organic nanoparticles and nanoscale fluorescent pigment particles of the present disclosure. In particular embodiments, the fluorescent organic nanoparticles of the present disclosure are used in inkjet compositions.

EMBODIMENTS

Embodiments of the present disclosure provide radiation-curable compositions containing fluorescent nanoparticles. The radiation-curable compositions generally comprise a polymeric dispersant, a curable carrier material, and fluorescent nanoparticle composition comprising at least one nanoscale fluorescent pigment particle and/or at least one fluorescent organic nanoparticle. The radiation-curable carrier material is typically a radiation-curable monomer, radiation-curable oligomer, radiation-curable polymer, or mixtures thereof. The radiation-curable compositions are useful, for example, as ink and coating compositions.

As used herein "disperse," "dispersible," and "dispersion" refer to the ability of the individual nanoparticle(s) to exist in solution without completely dissociating into the representative individual molecules that assembled to form the individual nanoparticle(s).

The term "substantially colorless" as used herein refers to the transparency of the nanoscale fluorescent pigment particles and/or fluorescent organic nanoparticles dispersed in a solvent. Specifically, the nanoparticles are substantially colorless when a substantial portion of the individual nanoparticles dispersed in a solvent are undetectable upon visual inspection.

The "average" fluorescent organic nanoparticle size, typically represented as $D_{50}$, is defined as the median particle size value at the 50th percentile of the particle size distribution, wherein 50% of the particles in the distribution are greater than the $D_{50}$ particle size value and the other 50% of the particles in the distribution are less than the $D_{50}$ value. Average particle size may be measured by methods that use light scattering technology to infer particle size, such as Dynamic Light Scattering with a Nicomp Particle analyzer.

Geometric standard deviation is a dimensionless number that typically estimates a population's dispersion of a given attribute (for instance, particle size) about the median value of the population and is derived from the exponentiated value of the standard deviation of the log-transformed values. If the geometric mean (or median) of a set of numbers $\{A_1, A_2, \ldots, A_n\}$ is denoted as $\mu_g$, then the geometric standard deviation is calculated as:

$$\sigma_g = \exp\sqrt{\frac{\sum_{i=1}^{n}(\ln A_i - \ln \mu_g)^2}{n}}$$

The term "average particle diameter" as used herein refers to the average length of the nanoscale fluorescent pigment particle as derived from images of the particles generated by Transmission Electron Microscopy (TEM).

The term "average aspect ratio" as used herein refers to the average ratio of the length divided by the width (length:width) of the nanoscale fluorescent pigment particle as derived from images of the particles generated by TEM.

The term "nanoscale" as used herein refers to pigment particles having a maximum length of less than or equal to about $5 \times 10^2$ nm in addition to a maximum width of less than or equal to about $1 \times 10^2$ nm.

In a first embodiment the fluorescent nanoparticle, further comprises a fluorescent nanoparticle composition having at least one functional moiety, and at least one sterically bulky stabilizer compound each having at least one functional group, wherein the functional moiety on the pigment associates non-covalently with the functional group of the stabilizer so as to afford nanoscale-sized particles.

Specific examples include nanoscale benzothioxanthene pigment particles, and methods for producing such nanoscale benzothioxanthene pigment particles.

Benzothioxanthene pigment particles, when properly synthesized using exemplary conditions and stabilizers outlined here in the embodiments, will have a more regular distribution of nanoscale particle sizes and particle aspect ratio (length:width), the latter being about less than 5:1 to about 1:1 with the average particle length of less than about 500 nm, such as less than about 150 nm, or less than about 100 nm as measured in TEM images; and the average particle width of less than about 100 nm, such as less than about 30 nm, or less than about 20 nm, as measured in TEM images.

An advantage of the processes and compositions of the disclosure is that they provide the ability to tune particle size and composition for the intended end use application of the benzothioxanthene pigment. In embodiments, as both the particle size and particle size distribution of pigment particles decreases, the more transparent the particles become. Preferably, this leads to an overall higher color purity of the pigment particles when they are dispersed onto various media via from being coated, sprayed, jetted, extruded, etc.

A steric stabilizer may have the potential to associate itself with the pigment's and/or the pigment precursors functional moieties via, for example, hydrogen bonding, van der Waals forces, and aromatic pi-stacking such that a controlled crystallization of nanopigment particles occurs. That is, the steric stabilizer provides a functional group that is a complementary part to the functional moiety of the pigment and/or the pigment precursor. The term "complementary" as used in the phrase "complementary functional moiety of the stabilizer" indicates that the complementary functional moiety is capable of non-covalent chemical bonding such as "hydrogen bonding" with the functional moiety of the organic pigment and/or the functional moiety of the pigment precursor. The steric stabilizer loading in the reaction may vary between 5 to about 300 mol %, such as about 10 to 150% mol or about 20 to 70% mol to pigment The functional moiety of the organic pigment/pigment precursor may be any suitable moiety capable of non-covalent bonding with the complementary functional moiety of the stabilizer. For the pigment, illustrative functional moieties include, but are not limited to, the following: carbonyl groups (C=O); various sulfur containing groups, for example, sulfides, sulfones, sulfoxides, and the like; and substituted amino groups. For the pigment precursor, functional moieties include, but are not limited to, carboxylic acid groups (COOH), ester groups (COOR, where R is any hydrocarbon), anhydride groups, and amide groups.

Representative precursors include substituted naphthalene anhydrides and anilines, as indicated in Scheme 1 below. The functional moieties $R_1$, $R_2$, $R_3$, $R_4$, $R_5$, $R_6$, $R_7$, $R_8$ may be present at any position on the naphthalene and aniline aromatic ring such as ortho, meta or para; they may be different or identical with each other and include but are not limited to any combination of the following functional groups; H, methyl, methoxy and carbonyl.

The pigment is prepared according to Scheme 1.

Scheme 1. Synthesis of benzo[k,1]thioxanthene-3,4-dicarboxylic anhydride

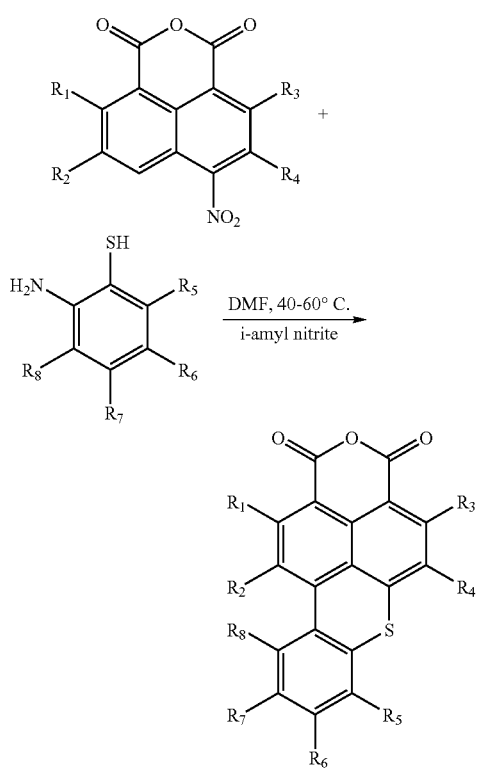

Illustrative examples of such functional moieties include: $R_1=R_2=R_3=R_4=R_5=R_6=R_7=R_8=H$, any alkyl, any aryl; $R_1=CH_3$, any alkyl, any aryl, O-alkyl, O-aryl, CH=O, $R_2=R_3=R_4=R_5=R_6=R_7=R_8=H$; $R_2=CH_3$, any alkyl, any aryl, O-alkyl, O-aryl, CH=O, $R_1=R_3=R_4=R_5=R_6=R_7=R_8=H$; $R_3=CH_3$, any alkyl, any aryl, O-alkyl, O-aryl, CH=O, $R_1=R_2=R_4=R_5=R_6=R_7=R_8=H$; $R_4=CH_3$, any alkyl, any aryl, O-alkyl, O-aryl, CH=O, $R_1=R_2=R_3=R_5=R_6=R_7=R_8=H$; $R_5=CH_3$, any alkyl, any aryl, O-alkyl, O-aryl, $R_1=R_2=R_3=R_4=R_6=R_7=R_8=H$; $R_6=CH_3$, any alkyl, any aryl, O-alkyl, O-aryl, $R_1=R_2=R_3=R_4=R_5=R_7=R_8=H$; $R_7=CH_3$, any alkyl, any aryl, O-alkyl, O-aryl, $R_1=R_2=R_3=R_4=R_5=R_6=R_8=H$; $R_8=CH_3$, any alkyl, any aryl, O-alkyl, O-aryl, $R_1=R_2=R_3=R_4=R_5=R_6=R_7=H$; $R_1=R_2=CH_3$, any alkyl, any aryl, O-alkyl, O-aryl, CH=O, $R_3=R_4=R_5=R_6=R_7=R_8=H$; $R_1=R_4=CH_3$, any alkyl, any aryl, O-alkyl, O-aryl, CH=O, $R_3=R_2=R_5=R_6=R_7=R_8=H$; $R_1=R_3=CH_3$, any alkyl, any aryl, O-alkyl, O-aryl, CH=O, $R_4=R_2=R_5=R_6=R_7=R_8=H$; $R_2=R_3=CH_3$, any alkyl, any aryl, O-alkyl, O-aryl, CH=O, $R_1=R_4=R_5=R_6=R_7=R_8=H$; $R_3=R_4=CH_3$, any alkyl, any aryl, O-alkyl, O-aryl, CH=O, $R_1=R_2=R_5=R_6=R_7=R_8=H$; $R_1=R_2=R_3=CH_3$, any alkyl, any aryl, O-alkyl, O-aryl, CH=O, $R_4=R_5=R_6=R_7=R_8=H$; $R_1=R_3=R_4=CH_3$, any alkyl, any aryl, O-alkyl, O-aryl, CH=O, $R_2=R_5=R_6=R_7=R_8=H$; $R_1=R_2=R_3=R_4=CH_3$, any alkyl, any aryl, O-alkyl, O-aryl, CH=O, $R_5=R_6=R_7=R_8=H$; $R_1=R_2=R_3=R_4=CH_3$, any alkyl any aryl, O-alkyl, O-aryl, CH=O, $R_5=CH_3$, any alkyl, any aryl, O-alkyl, O-aryl, $R_6=R_7=R_8=H$; $R_1=R_2=R_3=R_4=CH_3$, any alkyl, any aryl, O-alkyl, O-aryl, CH=O, $R_6=CH_3$, any alkyl, any aryl, O-alkyl, O-aryl, $R_5=R_7=R_8=H$; $R_1=R_2=R_3=R_4=CH_3$, any alkyl, any aryl, O-alkyl, O-aryl, CH=O; $R_7=CH_3$, any alkyl, any aryl, O-alkyl, O-aryl, $R_5=R_6=R_8=H$; and $R_1=R_2=R_3=R_4=CH_3$, any alkyl, any aryl, O-alkyl, O-aryl, CH=O, $R_8=CH_3$, any alkyl, any aryl, O-alkyl, O-aryl, $R_5=R_6=R_7=H$.

The complementary functional moiety of the stabilizer may be any suitable moiety capable of non-covalent bonding with the functional moiety of the stabilizer. Illustrative compounds containing complementary functional moieties include, but are not limited to, the following classes: beta-amino carboxylic acids and their esters containing large aromatic moieties such as phenyl, benzyl, naphthyl and the like, long linear or branched aliphatic chains such as having about 5 to about 20 carbons such as pentyl, hexyl, heptyl, octyl, nonyl, decyl, undecyl and the like; beta-hydroxy carboxylic acids and their esters containing long linear, cyclic or branched aliphatic chains such as having 5 to about 60 carbons such as pentyl, hexyl, cyclohexyl, heptyl, octyl, nonyl, decyl, undecyl and the like; sorbitol esters with long chain aliphatic carboxylic acids such as lauric acid, oleic acid, palmitic acid, stearic acid; polymeric compounds such as polyvinylpyrrolidone, poly(1-vinylpyrrolidone)-graft-(1-hexadecene), poly(1-vinylpyrrolidone)-graft-(1-triacontene), and poly(1-vinylpyrrolidone-co-acrylic acid).

The sterically bulky group of the stabilizer may be any suitable moiety that limits the extent of particle self-assembly to nanosized particles. It is understood that "sterically bulky group" is a relative term requiring comparison with the size of the precursor/pigment; a particular group may or may not be "sterically bulky" depending on the relative size between the particular group and the precursor/pigment. As used herein, the phrase "sterically bulky" refers to the spatial arrangement of a large group attached to a molecule.

Representative stabilizers to enable nanosized particles include but are not limited to, the following: mono and tri-esters of sorbitol (SPAN®'s) with palmitic acid (SPAN® 40), stearic acid (SPAN® 60) and oleic acid (SPAN® 85) where the aliphatic chain of the acid is considered sterically bulky; tartaric acid esters with cyclohexaniol and Isofol 20 where the cyclohexane moiety and the branched chain of Isofol are considered sterically bulky; polymers such as polyvinylpyrrolidone, poly(1-vinylpyrrolidone)-graft-(1-hexadecene), poly(1-vinylpyrrolidone)-graft-(1-triacontene), poly(1-vinylpyrrolidone-co-acrylic acid) where the polymeric chain in itself is considered sterically bulky.

The non-covalent chemical bonding between the functional moiety of the precursor/pigment and the complementary functional moiety of the stabilizer is, for example, afforded by van der Waals' forces, ionic bonding, hydrogen bonding, and/or aromatic pi-stacking bonding. In embodiments, the non-covalent bonding is ionic bonding and/or hydrogen bonding but excluding aromatic pi-stacking bonding. In embodiments, the non-covalent bonding may be predominately hydrogen bonding or may be predominately aromatic pi-stacking bonding, where the term "predominately" indicates in this case the dominant nature of association of the stabilizer with the pigment particle.

In embodiments, for the acid dissolution of the pigment, any suitable agent may be used to completely solubilize the pigment subjecting the solution to conditions, which re-precipitate the solubilized pigment into nano-sized particles. Representative examples include, but are not limited to, sulfuric acid, nitric acid, mono-, di-, and tri-halo acetic acids such as trifluoroacetic acid, dichloroacetic acid and the like, halogen acids such as hydrochloric acid, phosphoric acid and polyphosphoric acid, boric acid, and a variety of mixtures thereof.

Any suitable liquid medium may be used to carry out the re-precipitation of the benzothioxanthene pigment so as to afford nanoscale particles. Examples of suitable liquid media include, but are not limited to, the following organic liquids such as: N-methyl-2-pyrrolidinone, dimethyl sulfoxide, N,N-dimethylformamide, N,N-dimethylacetamide, sulfolane, hexamethylphosphoramide, among others.

Any liquid that will not dissolve the pigment may be used as an optional precipitating agent. Illustrative precipitating agents include, but are not limited to, alcohols such as methanol, ethanol, 1-propanol, 2-propanol, 1-butanol, 2-butanol; water; tetrahydrofuran; ethyl acetate; hydrocarbon solvents such as hexanes, toluene, xylenes, and Isopar solvents; and mixtures thereof.

The steric stabilizer loading in the reaction may vary between about 5 to about 300 mol %, such as about 10 to about 150 mol %, or about 20 to about 70 mol % to pigment. Optionally, the solids concentration of the nanoscale pigment particle in the final precipitated mixture may vary from 0.5% to about 20% by weight such as from about 0.5% to about 10% by weight, or about 0.5% to about 5% by weight, but the actual value may also be outside these ranges.

In an embodiment, the crude benzothioxanthene pigment is first solubilized in an acidic liquid, such as, concentrated sulfuric acid, which is then added slowly under vigorous agitation to a second solution comprising a suitable solvent and a steric stabilizer compound, and optionally a minor amount of a surface-active agent or other common additive. During the addition, the temperature is maintained anywhere from about 0° C. to about 40° C., although the re-precipitation of benzothioxanthene pigment to form nanoscale particles may be held isothermally within or outside this temperature range in one embodiment and, in another embodiment, the temperature during re-precipitation of benzothioxanthene pigment to form nanoscale particles may also be allowed to cycle up and down within or outside this temperature range.

In an embodiment, a first solution is prepared or provided that comprises pigment particles dissolved or dispersed in a strong acid. The strong acid may be, for example, a mineral acid, an organic acid, or a mixture thereof. Examples of strong mineral acids include sulfuric acid, nitric acid, perchloric acid, various hydrohalic acids (such as hydrochloric acid, hydrobromic acid, and hydrofluoric acid), fluorosulfonic acid, chlorosulfonic acid, phosphoric acid, polyphosphoric acid, boric acid, mixtures thereof, and the like. Examples of strong organic acids include organic sulfonic acid, such as methanesulfonic acid and toluenesulfonic acid, acetic acid, trifluoroacetic acid, chloroacetic acid, cyanoacetic acid, mixtures thereof, and the like.

This first solution may include the strong acid in any desirable amount or concentration, such as to allow for desired dissolution or dispersion of the pigment particles. The acid solution contains pigment in a concentration of about 0.5% to about 20%, such as from about 1% to about 15% or from about 2% to about 10% by weight, although the values may also be outside these ranges.

In an embodiment, the second solution is prepared or provided that comprises the steric stabilizer. Suitable steric stabilizers include those described earlier, and may include others such as the surface-active agents described previously that have functional groups that also interact with the functional moieties of the pigment particles to provide additional stabilization. The steric stabilizer may be introduced in the form of a solution, where the steric stabilizer is either dissolved or finely suspended in a suitable liquid medium, such as water or polar organic solvents such as acetone, acetonitrile, ethyl acetate, alcohols such as methanol, ethanol, isopropanol, diethyl ether, tetrahydrofuran, N-methyl-2-pyrrolidinone, dimethyl sulfoxide, N,N-dimethylformamide, mixtures thereof, and the like. For example, a suitable liquid medium in an embodiment is a mixture of water and N-methyl-2-pyrrolidinone. Such mixtures may contain water and N-methyl-pyrrolidinone in a ratio of about 1:6 to about 1:3, such as about 1:4.

In an embodiment, a precipitating agent, such as those described above, may also be incorporated into the second solution. Precipitating agents are liquids that do not solubilize the pigment and include, but are not limited to, water, alcohols such as methanol, ethanol and isopropanol and various mixtures thereof. The precipitating agent may be added in a range of about 10% to about 100% by volume out of the total volume of the mixture, such as between about 20% and about 80%, or between about 30% and about 70%.

The re-precipitation of the pigment to form nanoscale pigment particles may be conducted by adding the first (dissolved pigment) solution to the second (steric stabilizer) solution. This addition is conducted slowly by adding the first (dissolved pigment) solution to the second (steric stabilizer) solution under agitation by use of mechanical stirring or homogenization or other means. Methods of addition may include drop-wise from a suitable vessel, or spraying with or without the use of a nebulizing gas.

The re-precipitation process may be conducted at any desired temperature to allow for formation of nanoscale benzothioxanthene pigment particles while maintaining solubility of the first and second solutions. For example, the re-precipitation may be conducted at a temperature of from about 0° to about 90° C., such as from about 0° to about 60° C., or from about 0° to about 30° C., although temperatures outside of these ranges may be used. In one embodiment, the re-precipitation may be performed essentially isothermally, where a substantially constant temperature is maintained, while in another embodiment, the temperature during re-precipitation may be allowed to fluctuate within the above range, where the fluctuation may be cyclic or the like.

After addition of the first solution (dissolved pigment) to the second solution, it is believed that a non-covalent bonding interaction occurs between the functional moieties present on the pigment molecules and the functional groups of the steric stabilizer molecules, which creates a steric barrier that limits or prevents further aggregation of the pigment molecules. In this way, the pigment particle size and morphology, may be controlled and even tailored by providing steric stabilizer compositions and process conditions that limit pigment particle growth to a desired level.

Once the re-precipitation is complete, the pigment nanoscale particles may be separated from the solution by any conventional means, such as, vacuum-filtration methods or centrifugal separation methods. The nanoscale particles may also be processed for subsequent use according to known methods.

In an embodiment, acid dissolution and reconstitution may be performed utilizing a solution of pigment in, for example, concentrated sulfuric acid and the solution is added slowly with vigorous stirring to a solution of a suitable solvent containing the optimum amount of steric stabilizer. During the addition, the temperature is maintained at about 20° C. to below about 60° C., although the re-precipitation of benzothioxanthene into nanoscale particles may be held isothermally within or outside this temperature range in one embodiment and, in another embodiment, the temperature during re-precipitation of benzothioxanthene into nanoscale particles may also be allowed to cycle up and down within or outside this temperature range.

In a second embodiment, radiation-curable compositions may also contain at least one "fluorescent organic nanoparticle" made by preparing a polymer latex by using an emulsion aggregation process. As used herein "fluorescent organic nanoparticle" describe a polymer matrix comprising one or more polymer resins, including one or more crosslinked resins, and one or more fluorescent dyes dispersed inside the resin matrix. The fluorescent organic nanoparticles are of a maximum size less than about 500 nm, such as less than about 200 nm, or less than about 100 nm as measured with a Nicomp Particle analyzer. In particular embodiments, the fluorescent organic nanoparticles are robust, hard particles and are dispersible in organic solvents.

Fluorescent dyes that may be used include any fluorescent dye that is soluble or dispersible in the polymer latex or emulsion. The one or more fluorescent dyes comprises from about 0.01 to about 50 weight percent to total weight of the nanoparticle, such as from about 1 to about 40 weight percent to total weight of the nanoparticle, or from about 3 to about 20 weight percent to total weight of the nanoparticle. Examples of suitable fluorescent dyes include, for example, aryl-acetylenes, 2,5-diaryl-oxazoles, 1,2,3-oxadiazoles, aryl-substituted 2-pyrazolidines, xanthones, thioxanthones and acridones, benzazoles, benzotriazoles, benzoquinolines, fluoresceine derivatives, derivatives of phenothiazinle, phenoxazine, quinine derivatives (including quinine derivatives having fused aromatic rings), coumarins, indigo derivatives, derivatives of naphthalic anhydride and naphthalimide, perilenes and the like.

Other fluorescent dyes that may be used in the nanoparticles include fluorescent compounds or dyes that are invisible to the naked eye referred to herein as "invisible fluorescent dyes." Examples of such invisible fluorescent dyes include those that are invisible under ambient light but emit bright colors under black light, for example, those emitting green, yellow, red and orange light may also be used. Examples of such compounds include Near IR emitting compounds and dyes such as coordination compounds of organic lanthanides as described, for example, in U.S. Pat. No. 5,435,937, which is hereby incorporated by reference in its entirety.

Near IR fluorescent lanthanides are fluorescence compounds which cannot be seen by the naked eye. Examples of IR emitting organic dyes are described, for example, in U.S. Pat. No. 5,093,147, which is hereby incorporated by reference in its entirety.

Suitable resins include, for example, an amorphous resin or a mixture of amorphous resins having a Tg over about 180° C., such as a Tg over about 200° C. or a Tg over about 220° C., an amorphous resin or mixture of amorphous resins with a Tg lower than about 180° C., such as a Tg over about 200° C. or a Tg over about 220° C. as long as a crosslinker is present so that the resulting Tg of the resin is higher than about 180° C., such as a Tg over about 200° C. or a Tg over about 220° C., and a crystalline polymer or crystalline polymer mixture as long as the melting temperature of the polymer binder is greater than about 180° C., such as the melting temperature of the polymer binder is greater than about 200° C. or the melting temperature of the polymer binder is greater than about 220° C.

Examples of suitable resins include, for example, a polymer selected from the group consisting of poly(styrene-alkyl acrylate), poly(styrene-1,3-diene), poly(styrene-alkyl methacrylate), poly(styrene-alkyl acrylate-acrylic acid), poly(styrene-1,3-diene-acrylic acid), poly(styrene-alkyl methacrylate-acrylic acid), poly(alkyl methacrylate-alkyl acrylate), poly(alkyl methacrylate-aryl acrylate), poly(aryl methacrylate-alkyl acrylate), poly(alkyl methacrylate-acrylic acid), poly(styrene-alkyl acrylate-acrylonitrile-acrylic acid), poly (styrene-1,3-diene-acrylonitrile-acrylic acid), and poly(alkyl acrylate-acrylonitrile-acrylic acid); a process wherein the latex contains a resin selected from the group consisting of poly(styrene-butadiene), poly(methylstyrene-butadiene), poly(methyl methacrylate-butadiene), poly(ethyl methacrylate-butadiene), poly(propyl methacrylate-butadiene), poly (butyl methacrylate-butadiene), poly(methyl acrylate-butadiene), poly(ethyl acrylate-butadiene), poly(propyl acrylate-butadiene), poly(butyl acrylate-butadiene), poly(styrene-isoprene), poly(methylstyrene-isoprene), poly(methyl methacrylate-isoprene), poly(ethyl methacrylate-isoprene), poly(propyl methacrylate-isoprene), poly(butyl methacrylate-isoprene), poly(methyl acrylate-isoprene), poly(ethyl acrylate-isoprene), poly(propyl acrylate-isoprene), poly(butyl acrylate-isoprene), poly(styrene-propyl acrylate), poly (styrene-butyl acrylate), poly(styrene-butadiene-acrylic acid), poly(styrene-butadiene-methacrylic acid), poly(styrene-butadiene-acrylonitrile-acrylic acid), poly(styrene-butyl acrylate-acrylic acid), poly(styrene-butyl acrylate-methacrylic acid), poly(styrene-butyl acrylate-acrylononitrile), and poly(styrene-butyl acrylate-acrylononitrile-acrylic acid), combinations thereof and the like. The resins may also be functionalized, such as carboxylated, sulfonated, or the like, and particularly such as sodio sulfonated, if desired.

Other examples of suitable amorphous resins include polyesters, for example, polyethylene-terephthalate, polypropylene-terephthalate, polybutylene-terephthalate, polypentylene-terephthalate, polyhexalene-terephthalate, polyheptadene-terephthalate, polyoctalene-terephthalate, polyethylene-sebacate, polypropylene-sebacate, polybutylene-sebacate, polyethylene-adipate, polypropylene-adipate, polybutylene-adipate, polypentylene-adipate, polyhexylene-adipate, polyheptadene-adipate, polyoctalene-adipate, polyethylene-glutarate, polypropylene-glutarate, polybutylene-glutarate, polypentylene-glutarate, polyhexylene-glutarate, polyheptadene-glutarate, polyoctalene-glutarate, polyethylene-pimelate, polypropylene-pimelate, polybutylene-pimelate, polypentylene-pimelate, polyhexylene-pimelate, polyheptadene-pimelate, poly(propoxylated bisphenol-fumarate), poly(propoxylated bisphenol-succinate), poly(propoxylated bisphenol-adipate), poly(propoxylated bisphenol-glutarate), SPAR™ (Dixie Chemicals), BECKOSOL™ (Reichhold Inc), ARAKOTE™ (Ciba-Geigy Corporation), HETRON™ (Ashland Chemical), PARAPLEX™ (Rohm & Hass), POLYLITE™ (Reichhold Inc), PLASTHALL™ (Rohm & Hass), CYGAL™ (American Cyanamide), ARMCO™ (Armco Composites), ARPOL™ (Ashland Chemical), CELANEX™ (Celanese Eng), RYNITE™ (DuPont), STYPOL™ (Freeman Chemical Corporation), combinations thereof and the like. The resins may also be functionalized, such as carboxylated, sulfonated, or the like, or sodio sulfonated, if desired.

Illustrative examples of crystalline polymer resins include any of the various crystalline polyesters, such as poly(ethylene-adipate), poly(propylene-adipate), poly(butylene-adipate), poly(pentylene-adipate), poly(hexylene-adipate), poly(octylene-adipate), poly(ethylene-succinate), poly(propylene-succinate), poly(butylene-succinate), poly(pentylene-succinate), poly(hexylene-succinate), poly(octylene-succinate), poly(ethylene-sebacate), poly(propylene-sebacate), poly(butylene-sebacate), poly(pentylene-sebacate), poly(hexylene-sebacate), poly(octylene-sebacate), copoly(5-sulfoisophthaloyl)-copoly(ethylene-adipate), copoly(5-sulfoisophthaloyl)-copoly(propylene-adipate), copoly(5-sulfoisophthaloyl)-copoly(butylene-adipate), copoly(5-sulfo-isophthaloyl)-copoly(pentylene-adipate), copoly(5-sulfo-isophthaloyl)-copoly(hexylene-adipate), copoly(5-sulfo-isophthaloyl)-copoly(octylene-adipate), copoly(5-sulfo-isophthaloyl)-copoly(ethylene-adipate), copoly(5-sulfo-isophthaloyl)-copoly(propylene-adipate), copoly(5-sulfo-isophthaloyl)-copoly(butylene-adipate), copoly(5-sulfo-isophthaloyl)-copoly(pentylene-adipate), copoly(5-sulfo-isophthaloyl)-copoly(hexylene-adipate), copoly(5-sulfo-isophthaloyl)-copoly(octylene-adipate), copoly(5-sulfoisophthaloyl)-copoly(ethylene-succinate), copoly(5-sulfoisophthaloyl)-copoly(propylene-succinate), copoly(5-sulfoisophthaloyl)-copoly(butylene-succinate), copoly(5-sulfoisophthaloyl)-copoly(pentylene-succinate), copoly(5-sulfoisophthaloyl)-copoly(hexylene-succinate), copoly(5-sulfo-isophthaloyl)-copoly(octylene-succinate), copoly(5-sulfo-isophthaloyl)-copoly(ethylene-sebacate), copoly(5-sulfo-isophthaloyl)-copoly(propylene-sebacate), copoly(5-sulfo-isophthaloyl)-copoly(butylenes-sebacate), copoly(5-sulfo-isophthaloyl)-copoly(pentylene-sebacate), copoly(5-sulfo-isophthaloyl)-copoly(hexylene-sebacate), copoly(5-sulfo-isophthaloyl)-copoly(octylene-sebacate), copoly(5-sulfo-isophthaloyl)-copoly(ethylene-adipate), copoly(5-sulfo-isophthaloyl)-copoly(propylene-adipate), copoly(5-sulfo-isophthaloyl)-copoly(butylene-adipate), copoly(5-sulfo-isophthaloyl)-copoly(pentylene-adipate), copoly(5-sulfo-isophthaloyl)-copoly(hexylene-adipate), and poly(octylene-adipate).

The crystalline resins may be prepared, for example, by a polycondensation process by reacting suitable organic diol(s) and suitable organic diacid(s) in the presence of a polycondensation catalyst. Generally, a stoichiometric equimolar ratio of organic diol and organic diacid is utilized; however, in some instances, where the boiling point of the organic diol is from about 180° C. to about 230° C., an excess amount of diol may be utilized and removed during the polycondensation process. The amount of catalyst utilized varies, and may be selected in an amount, for example, of from about 0.01 to about 1 mole percent of the resin. Additionally, in place of the organic diacid, an organic diester may also be selected, where an alcohol byproduct is generated.

Examples of organic diols include aliphatic diols with from about 2 to about 36 carbon atoms, such as 1,2-ethanediol, 1,3-propanediol, 1,4-butanediol, 1,5-pentanediol, 1,6-hexanediol, 1,7-heptanediol, 1,8-octanediol, 1,9-nonanediol, 1,10-decanediol, 1,12-dodecanediol, and the like; alkali sulfo-aliphatic diols such as sodio 2-sulfo-1,2-ethanediol, lithio 2-sulfo-1,2-ethanediol, potassio 2-sulfo-1,2-ethanediol, sodio 2-sulfo-1,3-propanediol, lithio 2-sulfo-1,3-propanediol, potassio 2-sulfo-1,3-propanediol, mixture thereof, and the like. The aliphatic diol is, for example, selected in an amount of from about 45 to about 50 mole percent of the resin, and the alkali sulfo-aliphatic diol may be selected in an amount of from about 1 to about 10 mole percent of the resin.

Examples of organic diacids or diesters selected for the preparation of the crystalline polyester resins include oxalic acid, succinic acid, glutaric acid, adipic acid, suberic acid, azelaic acid, sebacic acid, phthalic acid, isophthalic acid, terephthalic acid, napthalene-2,6-dicarboxylic acid, naphthalene-2,7-dicarboxylic acid, cyclohexane dicarboxylic acid, malonic acid, mesaconic acid, and diesters or anhydrides thereof; and an alkali sulfo-organic diacid such as the sodio, lithio or potassium salt of dimethyl-5-sulfo-isophthalate, dialkyl-5-sulfo-isophthalate-4-sulfo-1,8-naphthalic anhydride, 4-sulfo-phthalic acid, dimethyl-4-sulfo-phthalate, dialkyl-4-sulfo-phthalate, 4-sulfophenyl-3,5-dicarbomethoxybenzene, 6-sulfo-2-naphthyl-3,5-dicarbomethoxybenzene, sulfo-terephthalic acid, dimethyl-sulfo-terephthalate, 5-sulfo-isophthalic acid, dialkyl-sulfo-terephthalate, sulfoethanediol, 2-sulfopropanediol, 2-sulfobutanediol, 3-sulfopentanediol, 2-sulfohexanediol, 3-sulfo-2-methylpentanediol, 2-sulfo-3,3-dimethylpentanediol, sulfo-p-hydroxybenzoic acid, N,N-bis(2-hydroxyethyl)-2-amino ethane sulfonate, or mixtures thereof. The organic diacid is selected in an amount of, for example, from about 40 to about 50 mole percent of the resin, and the alkali sulfoaliphatic diacid may be selected in an amount of from about 1 to about 10 mole percent of the resin.

Linear amorphous polyester resins may be prepared, for example, by the polycondensation of an organic diol, a diacid or diester, and a polycondensation catalyst. For the branched amorphous sulfonated polyester resin, the same materials may be used, with the further inclusion of a branching agent such as a multivalent polyacid or polyol. The amorphous resin is present in various suitable amounts, such as from about 60 to about 90 weight percent, or from about 50 to about 65 weight percent, of the solids.

Examples of diacid or diesters selected for the preparation of amorphous polyesters include dicarboxylic acids or diesters selected from the group consisting of terephthalic acid, phthalic acid, isophthalic acid, fumaric acid, maleic acid, itaconic acid, succinic acid, succinic anhydride, dodecylsuccinic acid, dodecylsuccinic anhydride, glutaric acid, glutaric anhydride, adipic acid, pimelic acid, suberic acid, azelic acid, dodecanediacid, dimethyl terephthalate, diethyl terephthalate, dimethylisophthalate, diethylisophthalate, dimethylphthalate, phthalic anhydride, diethylphthalate, dimethylsuccinate, dimethylfumarate, dimethylmaleate, dimethylglutarate, dimethyladipate, dimethyl dodecylsuccinate, and mixtures thereof. The organic diacid or diester is selected, for example, from about 45 to about 52 mole percent of the resin. Examples of diols utilized in generating the amorphous polyester include 1,2-propanediol, 1,3-propanediol, 1,2-butanediol, 1,3-butanediol, 1,4-butanediol, pentanediol, hexanediol, 2,2-dimethylpropanediol, 2,2,3-trimethylhexanediol, heptanediol, dodecanediol, bis(hydroxyethyl)-bisphenol A, bis(2-hyroxypropyl)-bisphenol A, 1,4- cyclohexanedimethanol, 1,3-cyclohexanedimethanol, xylenedimethanol, cyclohexanediol, diethylene glycol, bis(2-hydroxyethyl) oxide, dipropylene glycol, dibutylene, and mixtures thereof. The amount of organic diol selected may vary, or, is, for example, from about 45 to about 52 mole percent of the resin.

Branching agents used in forming the branched amorphous sulfonated polyester include, for example, a multivalent polyacid such as 1,2,4-benzene-tricarboxylic acid, 1,2,4-cyclohexanetricarboxylic acid, 2,5,7-naphthalenetricarboxylic acid, 1,2,4-naphthalenetricarboxylic acid, 1,2,5-hexanetricarboxylic acid, 1,3-dicarboxyl-2-methyl-2-methylene-carboxylpropane, tetra(methylene-carboxyl)methane, and 1,2,7,8-octanetetracarboxylic acid, acid anhydrides thereof, and lower alkyl esters of the general formula RCOOR', where R and R' include from 1 to 6 carbon atoms; a multivalent polyol such as sorbitol, 1,2,3,6-hexanetetrol, 1,4-sorbitane, pentaerythritol, dipentaerythritol, tripentaerythritol, sucrose, 1,2,4-butanetriol, 1,2,5-pentatriol, glycerol, 2-methylpropanetriol, 2-methyl-1,2,4-butanetriol, trimethylolethane, trimethylolpropane, 1,3,5-trihydroxymethylbenzene, mixtures thereof, and the like. The branching agent amount selected is, for example, from about 0.1 to about 5 mole percent of the resin.

Examples of suitable polycondensation catalyst for either the crystalline or amorphous polyesters include tetraalkyl titanates, dialkyltin oxide such as dibutyltin oxide, tetraalkyltin such as dibutyltin dilaurate, dialkyltin oxide hydroxide such as butyltin oxide hydroxide, aluminum alkoxides, alkyl zinc, dialkyl zinc, zinc oxide, stannous oxide, or mixtures thereof; these catalysts are selected in amounts of, for example, from about 0.01 mole percent to about 5 mole percent based on the starting diacid or diester used to generate the polyester resin.

Linear or branched unsaturated polyesters selected for the in-situ preparation of the crosslinked particles and process of the present disclosure include low molecular weight condensation polymers that may be formed by step-wise reactions between both saturated and unsaturated diacids (or anhydrides) and dihydric alcohols (glycols or diols). The resulting unsaturated polyesters are reactive (for example, crosslinkable) on two fronts: (i) unsaturation sites (double bonds) along the polyester chain, and (ii) functional groups such as carboxyl, hydroxy, and the like groups amenable to acid-base reactions.

Typical unsaturated polyester resins useful for the present disclosure are prepared by melt polycondensation or other polymerization processes using diacids and/or anhydrides and diols.

Suitable diacids and dianhydrides include, but are not limited to, saturated diacids and/or dianhydrides such as for example succinic acid, glutaric acid, adipic acid, pimelic acid, suberic acid, azelaic acid, sebacic acid, isophthalic acid, terephthalic acid, hexachloroendo methylene tetrahydrophthalic acid, phthalic anhydride, chlorendic anhydride, tetrahydrophthalic anhydride, hexahydrophthalic anhydride, endomethylene tetrahydrophthalic anhydride, tetrachlorophthalic anhydride, tetrabromophthalic anhydride, and the like and mixtures thereof; and unsaturated diacids and/or anhydrides such as, for example, maleic acid, fumaric acid, chloromaleic acid, methacrylic acid, acrylic acid, itaconic acid, citraconic acid, mesaconic acid, maleic anhydride, and the like and mixtures thereof.

Suitable diols include, but are not limited to, for example, propylene glycol, ethylene glycol, diethylene glycol, neopentyl glycol, dipropylene glycol, dibromoneopentyl glycol, propoxylated bisphenol A, 2,2,4-trimethylpentane-1,3-diol, tetrabromo bisphenol dipropoxy ether, 1,4-butanediol, and the like and mixtures thereof. Preferred unsaturated polyester resins are prepared from diacids and/or anhydrides such as, for example, maleic anhydride, fumaric acid, and the like and mixtures thereof, and diols such as, for example, propoxylated bisphenol A, propylene glycol, and the like and mixtures thereof.

Monomers used in making the selected polymer are not limited, and the monomers utilized may include any one or more of, for example, ethylene, propylene, and the like. Known chain transfer agents, for example, dodecanethiol or carbon tetrabromide, may be utilized to control the molecular weight (Mw) properties of the polymer.

The resin or resins are included in the organic nanoparticle in an amount from about 50 to about 99.99 weight percent to total weight of the nanoparticle, such as from about 60 to about 99 weight percent to total weight of the nanoparticle, or from about 80 to about 97 weight percent to total weight of the nanoparticle. However, amounts outside of these ranges may be used in embodiments, depending upon the type and amounts of other materials present.

In a particular embodiment, forming the crosslinked resin emulsion is accomplished by dissolving the unsaturated polyester resin and an initiator in a suitable organic solvent under conditions that allow the solution to be formed. Suitable solvents that may be used include those in which the resin and any other optional components (such as a wax) are soluble, and that dissolves the resin component to form an emulsion, but which solvents may be subsequently evaporated-off to leave the resin in an emulsion, such as in water, at a specific particle size. For example, suitable solvents include alcohols, ketones, esters, ethers, chlorinated solvents, nitrogen containing solvents and mixtures thereof. Specific examples of suitable solvents include acetone, methyl acetate, methyl ethyl ketone, tetrahydrofuran, cyclohexanone, ethyl acetate, N,N dimethylformamide, dioctyl phthalate, toluene, xylene, benzene, dimethylsulfoxide, mixtures thereof, and the like. Particular solvents that may be used include acetone, methyl ethyl ketone, cyclohexanone, methyl acetate, ethyl acetate, dimethylsulfoxide, and mixtures thereof.

In an embodiment, the resin may be dissolved in the solvent at an elevated temperature, such as about 40 to about 80° C. or about 50 to about 70° or about 60 to about 65° C. For embodiments, the temperature is lower than the glass transition temperature of the resin. In embodiments, the resin is dissolved in the solvent at an elevated temperature, but below the boiling point of the solvent, such as at about 2 to about 15° C. or about 5 to about 10° C. below the boiling point of the solvent.

In addition to the resin and organic solvent, an initiator is included that subsequently crosslinks the resin. Any suitable initiator may be used such as, for example, free radical or thermal initiators such as organic peroxides and azo compounds. Examples of suitable organic peroxides include diacyl peroxides such as, for example, decanoyl peroxide, lauroyl peroxide and benzoyl peroxide; ketone peroxides such as, for example, cyclohexanone peroxide and methyl ethyl ketone; alkyl peroxyesters such as, for example, t-butyl peroxy neodecanoate, 2,5-dimethyl, 2,5-di(2-ethyl hexanoyl peroxy) hexane, t-amyl peroxy 2-ethyl hexanoate, t-butyl peroxy 2-ethyl hexanoate, t-butyl peroxy acetate, t-amyl peroxy acetate, t-butyl peroxy benzoate, t-amyl peroxy benzoate, oo-t-butyl o-isopropyl mono peroxy carbonate, 2,5-dimethyl 2,5-di(benzoyl peroxy)hexane, oo-t-butyl o-(2-ethyl hexyl) mono peroxy carbonate, and oo-t-amyl o-(2-ethyl hexyl) mono peroxy carbonate; alkyl peroxides such as, for example, dicumyl peroxide, 2,5-dimethyl 2,5-di(t-butyl peroxy)hexane, t-butyl cumyl peroxide, α-α-bis(t-butyl peroxy) diisopropyl benzene, di-t-butyl peroxide and 2,5-dimethyl 2,5-di (t-butyl peroxy)hexyne-3, alkyl hydroperoxides such as, for example, 2,5-dihydro peroxy 2,5-dimethyl hexane, cumene hydroperoxide, t-butyl hydroperoxide and t-amyl hydroperoxide; and alkyl peroxyketals such as, for example, n-butyl 4,4-di(t-butyl peroxy)valerate, 1,1-di(t-butyl peroxy) 3,3,5-trimethyl cyclohexane, 1,1-di(t-butyl peroxy)cyclohexane, 1,1-di(t-amyl peroxy)cyclohexane, 2,2di(t-butyl peroxy)butane, ethyl 3,3-di(t-butyl peroxy)butyrate and ethyl 3,3-di(t-amyl peroxy)butyrate. Examples of suitable azo compounds include 2,2'-azobis(2,4-dimethylpentane nitrile, azobis-isobutyronitrile, 2,2'-azobis (isobutyronitrile), 2,2'-azobis(2, 4-dimethyl valeronitrile), 2,2'-azobis(methyl butyronitrile), 1,1'-azobis(cyano cyclohexane) and other similar known compounds.

Although any suitable initiator may be used, in particular embodiments the initiator is an organic initiator that is soluble in the solvent, but not soluble in water. Further, the initiator should be "substantially non-reactive" at temperatures up to about 65 to about 70° C. such that "substantially no crosslinking" takes place until after the resin-solvent phase is well dispersed in the water phase. As used herein "substantially non-reactive" refers, for example, to "substantially no crosslinking" occurring between the polymer or resin material and the initiator which would affect the strength properties of the polymer or resin material. As used herein, "substantially no crosslinking" refers, for example, to less than about 1 percent, such as less than about 0.5 percent, or less than about 0.1 percent, cross linking between polymer chains in the resin.

In particular embodiments, a suitable amount of crosslinking monomer is added in order to provide improved robustness and hardness of the particles. Generally, the hardness of a particle correlates with the observed viscosity of a plurality of those particles. Therefore, an increase in the viscosity of a plurality of the particles would correspond to an increase in the hardness of the individual particles plurality of the particles.

In particular embodiments, substantially all of the initiator should react during a solvent flashing step when the mixture is raised to above about the boiling point of the solvent, such as about 80° C. or more, to flash off the residual solvent. Thus, the choice of initiator may be directed by its half-life/temperature characteristic. For example, half-life/temperature characteristic plots for Vazo® 52 (2,2'-azobis(2,4-dimethyl-pentane nitrile, E. I. du Pont de Nemours and Company, USA) shows a half-life greater than 90 minutes at 65° C. and less than 20 minutes at 80° C., which indicates that the initiator is particularly suitable for carrying out the crosslinking in the present solvent flashing process, because substantially no crosslinking takes place during the initial mixing phase of resin and solvent at 65° C. and substantially all of the crosslinking occurs during the solvent flashing step at temperatures up to 80° C.

The initiator may be included in any suitable amount to provide a specific degree of crosslinking. The initiator may be included in an amount of, for example, from about 0.1 to about 20 percent by weight of unsaturated resin, such as from about 0.5 or from about 1 to about 10 or about 15 percent by weight of unsaturated resin. In an embodiment, about 3 to about 6 percent by weight initiator is added.

In some embodiments, in situ crosslinking process utilizes an unsaturated resin such as, for example, an unsaturated amorphous linear or branched polyester resin. In other embodiments, the polymer matrix is prepared by thermal (radical) initiated crosslinking. Useful free-radical thermal initiators include, for example, azo, peroxide, persulfate, and redox initiators, and combinations thereof.

Suitable azo initiators include, for example, 2,2'-azobis(4-methoxy-2,4-dimethylvaleronitrile) (available under the trade designation "VAZO 33"), 2,2'-azobis(2-amidinopropane)dihydrochloride (available under the trade designation "VAZO 50"), 2,2-azobis(2,4-dimethylvaleronitrile) (available under the trade designation "VAZO 52"), 2,2'-azobis (isobutyronitrile) (available under the trade designation "VAZO 64"), 2,2'-azobis-2-methylbutyronitrile (available under the trade designation "VAZO 67"), and 1,1'-azobis(1-cyclohexanecarbonitrile) (available under the trade designation "VAZO 88"), all of which are available from E.I. du Pont de Nemours and Company, Wilmington, Del.; and 2,2'-azobis (methyl isobutyrate) (available under the trade designation "V-601" from Wako Pure Chemical Industries, Ltd., Osaka, Japan).

Suitable peroxide initiators include, for example, benzoyl peroxide, acetyl peroxide, lauroyl peroxide, decanoyl peroxide, dicetyl peroxydicarbonate, di(4-t-butylcyclohexyl)peroxydicarbonate (available under the trade designation "PEPRKADOX 16", from Akzo Chemicals, Chicago, Ill.), di(2-ethylhexyl)peroxydicarbonate, t-butylperoxypivalate (available under the trade designation "LUPERSOL 11", from Lucidol Division, Atochem North America, Buffalo, N.Y.); t-butylperoxy-2-ethylhexanoate (available under the trade designation "TRIGONOX 21-C50" from Akzo Chemicals), and dicumyl peroxide.

Suitable persulfate initiators include, for example, potassium persulfate, sodium persulfate, and ammonium persulfate.

Suitable redox (oxidation-reduction) initiators include, for example, combinations of persulfate initiators with reducing agents including, for example, sodium metabisulfite and sodium bisulfite; systems based on organic peroxides and tertiary amines (e.g., benzoyl peroxide plus dimethylaniline); and systems based on organic hydroperoxides and transition metals (e.g., cumene hydroperoxide plus cobalt naphthenate).

After the resin and initiator are dissolved in the solvent, the resin and initiator solution is mixed into an emulsion medium, for example water such as deionized water containing a stabilizer, and optionally a surfactant. Examples of suitable stabilizers include water-soluble alkali metal hydroxides, such as sodium hydroxide, potassium hydroxide, lithium hydroxide, beryllium hydroxide, magnesium hydroxide, calcium hydroxide, or barium hydroxide; ammonium hydroxide; alkali metal carbonates, such as sodium bicarbonate, lithium bicarbonate, potassium bicarbonate, lithium carbonate, potassium carbonate, sodium carbonate, beryllium carbonate, magnesium carbonate, calcium carbonate, barium carbonate or cesium carbonate; and mixtures thereof. In a particular embodiment, the stabilizer is sodium bicarbonate or ammonium hydroxide. When the stabilizer is used in the composition, it may be present at a level of from about 0.1 to about 5 percent, such as about 0.5 to about 3 percent by weight of the resin. In embodiments, when such salts are added to the composition as a stabilizer, incompatible metal salts are not present in the composition. For example, when these salts are used the composition may be completely or essentially free of zinc and other incompatible metal ions, e.g., Ca, Fe, Ba, etc., which form water-insoluble salts. The term "essentially free" refers, for example, to the incompatible metal ions as present at a level of less than about 0.01 percent, such as less than about 0.005 or less than about 0.001 percent by weight of the wax and resin. In particular embodiments, the stabilizer may be added to the mixture at ambient temperature, or it may be heated to the mixture temperature prior to addition.

Optionally, an additional stabilizer, such as a surfactant, may be added to the aqueous emulsion medium such as to afford additional stabilization to the resin particles, particularly if wax is also included in the emulsion, albeit at a reduced level as compared to conventional wax emulsions. Suitable surfactants include anionic, cationic and nonionic surfactants. In embodiments, the use of anionic and nonionic surfactants may additionally help stabilize the aggregation process in the presence of the coagulant, which otherwise could lead to aggregation instability.

Anionic surfactants include sodium dodecylsulfate (SDS), sodium dodecyl benzene sulfonate, sodium dodecylnaphthalene sulfate, dialkyl benzenealkyl, sulfates and sulfonates, abitic acid, and the NEOGEN brand of anionic surfactants. An example of a suitable anionic surfactant is NEOGEN R-K available from Daiichi Kogyo Seiyaku Co. Ltd. (Japan), or TAYCAPOWER BN2060 from Tayca Corporation (Japan), which consists primarily of branched sodium dodecyl benzene sulfonate.

Examples of cationic surfactants include dialkyl benzene alkyl ammonium chloride, lauryl trimethyl ammonium chloride, alkylbenzyl methyl ammonium chloride, alkyl benzyl dimethyl ammonium bromide, benzalkonium chloride, cetyl pyridinium bromide, $C_{12}$, $C_{15}$, $C_{17}$ trimethyl ammonium bromides, halide salts of quaternized polyoxyethylalkylamines, dodecyl benzyl triethyl ammonium chloride, MIRAPOL and ALKAQUAT available from Alkaril Chemical Company, SANISOL (benzalkonium chloride) available from Kao Chemicals, and the like. An example of a suitable cationic surfactant is SANISOL B-50 available from Kao Corporation, which consists primarily of benzyl dimethyl alkonium chloride.

Examples of nonionic surfactants include polyvinyl alcohol, polyacrylic acid, methalose, methyl cellulose, ethyl cellulose, propyl cellulose, hydroxy ethyl cellulose, carboxy methyl cellulose, polyoxyethylene cetyl ether, polyoxyethylene lauryl ether, polyoxyethylene octyl ether, polyoxyethylene octylphenyl ether, polyoxyethylene oleyl ether, polyoxyethylene sorbitan monolaurate, polyoxyethylene stearyl ether, polyoxyethylene nonylphenyl ether, dialkylphenoxy poly(ethyleneoxy)ethanol, available from Rhone-Poulenc Inc. as IGEPAL CA-210, IGEPAL CA-520, IGEPAL CA-720, IGEPAL CO-890, IGEPAL CO-720, IGEPAL CO-290, IGEPAL CA-210, ANTAROX 890 and ANTAROX 897. An example of a suitable nonionic surfactant is ANTAROX 897 available from Rhone-Poulenc Inc., which consists primarily of alkyl phenol ethoxylate.

After the stabilizer or stabilizers are added, the resultant mixture may be mixed or homogenized for any specific time.

Next, the mixture is stirred and the solvent is evaporated off. Alternatively, the solvent may be flashed off. The solvent flashing may be conducted at any suitable temperature at or above about the boiling point of the solvent in water that will flash off the solvent, such as about 60 to about 100° C., for example, about 70 to about 90° C. or about 80° C., although the temperature may be adjusted based on, for example, the particular resin and solvent used.

Following the solvent evaporation (or flashing) step, the crosslinked polyester resin particles in embodiments have an average particle diameter in the range of about 20 to about 500 nm, such as from about 75 to 400 nm, or as from about 100 to about 200 nm as measured with a Nicomp Particle Analyzer.

The polyester resin latex or emulsion may be prepared by any suitable means. For example, the latex or emulsion may be prepared by taking the resin and heating it to its melting temperature and dispersing the resin in an aqueous phase containing a surfactant. The dispersion may be carried out by various dispersing equipment such as ultimizer, high speed homogenizer, or the like to provide submicron resin particles. Other ways to prepare the polyester resin latex or emulsion include solubilizing the resin in a solvent and adding it to heated water to flash evaporate the solvent. External dispersion may also be employed to assist the formation of emulsion as the solvent is being evaporated. Polyester resin emulsions prepared by other means or methods may also be utilized in the preparation of the toner composition.

Illustrative examples of such latex polymers include, but are not limited to, poly(styrene-butadiene), poly(methyl methacrylate-butadiene), poly(ethyl methacrylate-butadiene), poly(propyl methacrylate-butadiene), poly(butyl methacrylate-butadiene), poly(methyl acrylate-butadiene), poly(ethyl acrylate-butadiene), polypropyl acrylate-butadiene), poly(butyl acrylate-butadiene), poly(styrene-isoprene), poly(methylstyrene-isoprene), poly(methyl methacrylate-isoprene), poly(ethyl methacrylate-isoprene), polypropyl methacrylate-isoprene), poly(butyl methacrylate-isoprene), poly (methyl acrylate-isoprene), poly(ethyl acrylate-isoprene), poly(propyl acrylate-isoprene), poly(butyl acrylate-isoprene), poly(styrene-butylacrylate), poly(styrene-butadiene), poly(styrene-isoprene), poly(styrene-butyl methacrylate), poly(styrene-butyl acrylate-acrylic acid), poly(styrene-butadiene-acrylic acid), poly(styrene-isoprene-acrylic acid), poly (styrene-butyl methacrylate-acrylic acid), poly(butyl methacrylate-butyl acrylate), polybutyl methacrylate-acrylic acid), poly(styrene-butyl acrylate-acrylonitrile-acrylic acid), poly(acrylonitrile-butyl acrylate-acrylic acid), poly(styrene-butyl acrylate-2-carboxyethyl acrylate), poly(styrene-butadiene-2-carboxyethyl acrylate), poly(styrene-isoprene-2-carboxyethyl acrylate), poly(styrene-butyl methacrylate-2-carboxyethyl acrylate), poly(butyl methacrylate-butyl acrylate-2-carboxyethyl acrylate), poly(butyl methacrylate-2-carboxyethyl acrylate), poly(styrene-butyl acrylate-acrylonitrile-2-carboxyethyl acrylate), poly(acrylonitrile-butyl acrylate-2-carboxyethyl acrylate), branched/partially crosslinked copolymers of the above, and the like.

A third embodiment uses fluorescent radiation-curable compositions containing at least one "fluorescent organic nanoparticle" made by emulsion-polymerization. A latex emulsion comprised of polymer particles containing fluorescent material generated from the emulsion polymerization is prepared as follows. An anionic surfactant solution and de-ionized water is mixed in a stainless steel holding tank. The holding tank is then purged with nitrogen before transferring into the reactor. The reactor is then continuously purged with nitrogen while being stirred at 100 RPM. The reactor is then heated up to 80° C. at a controlled rate, and held there. Separately a solution of ammonium persulfate initiator and de-ionized water is prepared.

Separately a monomer emulsion is prepared consisting of methyl methacrylate, diethyleneglycol dimethacrylate, and a fluorescent pigment, This monomer solution is combined an anionic surfactant and deionized water to form an emulsion. 1% of the above emulsion is then slowly fed into the reactor containing the aqueous surfactant phase at 80° C. to form the "seeds" while being purged with nitrogen. The initiator solution is then slowly charged into the reactor and after 10 minutes the rest of the emulsion is continuously fed in a using metering pump at a rate of 0.5%/min. Once all the monomer emulsion is charged into the main reactor, the temperature is held at 80° C. for an additional 2 hours to complete the reaction. Full cooling is then applied and the reactor temperature is reduced to 35° C. The product is collected into a holding tank.

The fluorescent nanoparticles may be used, for example, as coloring agents in a variety of compositions, such as in liquid (aqueous or non-aqueous) ink vehicles, including inks used in conventional pens, markers, and the like, liquid inkjet ink compositions including radiation-curable liquid inks or phase change curable gel inks, solid or phase change ink compositions, and the like. For example, the colored nanoparticles may be formulated into a variety of ink vehicles, including "low energy" solid inks with melt temperatures of about 60 to about 130° C., and solvent-based liquid inks or radiation-curable such as UV-curable liquid inks comprised of alkyloxylated monomers, and even aqueous inks. Various types of such compositions will now be described in more detail.

Surfactant used in forming the monomer emulsion may be any surfactant that will provide an emulsification and latex, and would not significantly affect negatively the toner functional properties. The surfactants that may be added include ionic and/or nonionic surfactants.

A chain transfer agent may be added to the monomer emulsion to control the Mw properties of the polymer to be formed. Suitable chain transfer agents include, but are not limited to, dodecanethiol, butanethiol, isooctyl-3-mercaptopropionate (IOMP), 2-methyl-5-t-butylthiophenol, carbon tetrachloride, carbon tetrabromide, and the like. Chain transfer agents may be used in any effective amount, such as from about 0.1 to about 10 percent by weight of the monomer in the monomer emulsion.

An advantage of the present disclosure is that the nanoparticles have suitable thermal degradation properties. Thus, the nanoparticles of the present disclosure may be used for a variety of purposes, including for producing inks and the like. Examples of inks include inkjet inks and any other ink composition. Organic nanoparticles containing invisible fluorescent dyes may be used, for example, for fabrication of marking materials, for example, inkjet compositions used for security printing.

This disclosure refers to marking as a process of producing a pattern, such as text and/or images, on a substrate, such as paper or transparent plastic. A marking device performs the marking on the substrate with a marking material. Marking materials include ink, dye, or any other suitable marking material for marking on the substrate. The nanoparticles of the present disclosure may also be used in any marking device, alone or in combination with other marking materials.

In embodiments, these nanoparticles may be dispersed in a variety of media where such high specular reflectance is afforded. Polymeric binders (polymeric dispersants) that aid in the dispersion and coating ability of nanoscale-sized pigments include, but are not limited to, derivatives of rosin natural products, acrylic-based polymers, styrene-based copolymers, copolymers of α-olefins such as 1-hexadecene, 1-octadecene, 1-eicosene, 1-triacontene and the like, copolymers of vinyl pyridine, vinyl imidazole, vinyl pyrrolidinone, polyester copolymers, polyamide copolymers, and copolymers of acetals. More specific examples of polymeric dispersants include, but are not limited to, poly(vinyl butyral-co-vinyl alcohol-co-vinyl acetate), poly(vinyl acetate), poly (acrylic acid), poly(methacrylic acid), poly(vinyl alcohol), poly(methyl methacrylate), polyester, polycarbonate polymers such as Lexan®, polycarbonate, poly(styrene-b-4-vinylpyridine) and the like. Suitable mixtures of at least two polymers may also be used to generate nanoscale-sized pigments dispersions in liquid media.

The nanoparticles may be formulated into a number of different coating compositions having various adhesive and coloristic properties on different media, including paperstock, cardstock, and flexible substrates such as Melinex®, Mylar®, Cronar® and the like.

For considerations involving more permanent image robustness, radiation curable (such as UV-curable) inks may be used. The selection of monomers for radiation-curable dispersions, and inks made from them, is based on a number of criteria including the degree of acrylate functionality and reactivity, viscosity, thermal stability, surface tension, relative toxicological level, vapor pressure and other considerations such as relative commercial abundance and cost. It is desirable to have at least one radiation (such as UV) curable monomer that is a diacrylate which has a viscosity less than about 15 cP at room temperature (about 20° C.) and less than about 5 cP at 85° C. and which has a surface tension more than about 30 dynes/cm at room temperature (about 20° C.) and more than about 25 dynes/cm at 85° C., although the values may be outside these ranges. For example, a propoxylated neopentyl glycol diacrylate (SR-9003, available from Sartomer Company) satisfies these viscosity and surface tension requirements for radiation-curable dispersions suitable for preparing a radiation-curable inkjet ink.

In embodiments, the use of fluorescent dyes as colorants in radiation-curable inks and dispersions containing photoinitiators is limited and generally not desired as these dyes are generally not photo-stable during the curing process and may become severely bleached and washed out resulting in generally poor image quality and low optical contrast of the image. It is generally more desirable to utilize fluorescent pigments in radiation-curable dispersions and inks due to their much improved photo-stability over dyes during the curing process.

In other embodiments, it is also desirable to utilize fluorescent nanoparticles in radiation-curable inks and dispersions, an advantage being due to the smaller particles of nanoscale-sized particles compared with larger-sized conventional pigments, whereby a lesser amount by weight of fluorescent nanoparticles may be formulated within a radiation-curable ink or dispersion compared with using conventional pigments, to afford the same optical density of final cured image.

In some embodiments, the radiation-curable ink composition may include a radiation-curable gellant to act as a phase change agent to gel the UV-curable monomer as it is jetted from the printhead at elevated temperature and onto a substrate such as paper at reduced temperature.

In embodiments, the radiation-curable ink composition may include a radiation-curable wax, such as an acrylate wax, to act as a phase change agent in the radiation-curable vehicle. Suitable acrylate waxes include those described in U.S. Patent Publication No. 2007/0120925, the entire disclosure of which is incorporated herein by reference.

In still other embodiments, the radiation-curable ink composition may include at least one radiation-curable gellant and at least one radiation-curable wax.

In still other embodiments, radiation-curable compositions may also contain at least one non-fluorescent colorant. As used herein "colorant" includes pigment, dye, mixtures of dyes, mixtures of pigments, mixtures of dyes and pigments, and the like. The non-fluorescent colorant may be present in a colored ink in any desired amount, for example from about 0.5 to about 75 percent by weight of the ink vehicle or ink vehicle, for example from about 1 to about 50 percent by weight of the ink vehicle.

Examples of suitable non-fluorescent colorants include pigments, dyes, mixtures of pigments and dyes, mixtures of pigments, mixtures of dyes, and the like. Any dye or pigment may be chosen, provided that it is capable of being dispersed or dissolved in the ink vehicle and is compatible with the other ink components. Examples of suitable pigments include, but are not limited to, Violet PALIOGEN Violet 5100 (BASF); PALIOGEN Violet 5890 (BASF); HELIOGEN Green L8730 (BASF); LITHOL Scarlet D3700 (BASF); Sunfast® Blue 15:4 (Sun Chemical 249-0592); Hostaperm Blue B2G-D (Clariant); Permanent Red P-F7RK; Hostaperm Violet BL (Clariant); LITHOL Scarlet 4440 (BASF); Bon Red C (Dominion Color Company); ORACET Pink RF (Ciba); PALIOGEN Red 3871 K (BASF); Sunfast® Blue 15:3 (Sun Chemical 249-1284); PALIOGEN Red 3340 (BASF); Sunfast® Carbazole Violet 23 (Sun Chemical 246-1670); LITHOL Fast Scarlet L4300 (BASF); Sunbrite Yellow 17 (Sun Chemical 275-0023); HELIOGEN Blue L6900, L7020 (BASF); Sunbrite Yellow 74 (Sun Chemical 272-0558); Spectra Pac® C Orange 16 (Sun Chemical 276-3016); HELIOGEN Blue K6902, K6910 (BASF); Sunfast® Magenta 122 (Sun Chemical 228-0013); HELIOGEN Blue D6840, D7080 (BASF); Sudan Blue OS (BASF); NEOPEN Blue FF4012 (BASF); PV Fast Blue B2GO1 (Clariant); IRGALITE Blue BCA (Ciba); PALIOGEN Blue 6470 (BASF); Sudan Orange G (Aldrich), Sudan Orange 220 (BASE); PALIOGEN Orange 3040 (BASF); PALIOGEN Yellow 152, 1560 (BASF); LITHOL Fast Yellow 0991 K (BASF); PALIOTOL Yellow 1840 (BASF); NOVOPERM Yellow FGL (Clariant); Lumogen Yellow D0790 (BASF); Suco-Yellow L1250 (BASF); Suco-Yellow D1355 (BASE); Suco Fast Yellow D1 355, D1 351 (BASF); HOSTAPERM Pink E 02 (Clariant); Hansa Brilliant Yellow 5GX03 (Clariant); Permanent Yellow GRL 02 (Clariant); Permanent Rubine L6B 05 (Clariant); FANAL Pink D4830 (BASF); CINQUASIA Magenta (DU PONT), PALIOGEN Black L0084 (BASF); Pigment Black K801 (BASF); and carbon blacks such as REGAL 330™ (Cabot), Carbon Black 5250, Carbon Black 5750 (Columbia Chemical), mixtures thereof and the like. Examples of suitable dyes include Usharect Blue 86 (Direct Blue 86), available from Ushanti Color; Intralite Turquoise 8GL (Direct Blue 86), available from Classic Dyestuffs; Chemictive Brilliant Red 7BH (Reactive Red 4), available from Chemiequip; Levafix Black EB, available from Bayer; Reactron Red H8B (Reactive Red 31), available from Atlas Dye-Chem; D&C Red #28 (Acid Red 92), available from Warner-Jenkinson; Direct Brilliant Pink B, available from Global Colors; Acid Tartrazine, available from Metrochem Industries; Cartasol Yellow 6GF Clariant; Carta Blue 2GL, available from Clariant; and the like.

In embodiments, solvent dyes may be employed. Examples of solvent dyes suitable for use herein may include spirit soluble dyes because of their compatibility with the ink vehicles disclosed herein. Examples of suitable spirit solvent dyes include Neozapon Red 492 (BASF); Orasol Red G (Ciba); Direct Brilliant Pink B (Global Colors); Aizen Spilon Red C-BH (Hodogaya Chemical); Kayanol Red 3BL (Nippon Kayaku); Spirit Fast Yellow 3G; Aizen Spilon Yellow C-GNH (Hodogaya Chemical); Cartasol Brilliant Yellow 4 GB (Clariant); Pergasol Yellow CGP (Ciba); Orasol Black RLP (Ciba); Savinyl Black RLS (Clariant); Morfast Black Cone, A (Rohm and Haas); Orasol Blue GN (Ciba); Savinyl Blue GLS (Sandoz); Luxol Fast Blue MBSN (Pylam); Sevron Blue 5GMF (Classic Dyestuffs); Basacid Blue 750 (BASF); Neozapon Black X51 [C.I. Solvent Black, C.I. 12195] (BASF), Sudan Blue 670 [C.I. 61554] (BASF), Sudan Yellow 146 [C.I. 12700] (BASF), Sudan Red 462 [C.I. 260501] (BASF), mixtures thereof and the like.

Inkjet ink compositions according to this disclosure generally include a carrier, a colorant, and one or more additional additives. Such additives may include, for example, solvents, waxes, antioxidants, tackifiers, slip aids, curable components such as curable monomers and/or polymers, gellants, initiators, sensitizers, humectants, biocides, preservatives, and the like. Specific types and amounts of components will depend, of course, on the specific type of ink composition, such as liquid, curable, solid, hot melt, phase change, gel, or the like. The formed fluorescent nanoparticle compositions may be used, for example, in such inks as colorants.

Generally, ink compositions contain one or more colorant. Any desired or effective colorant may be employed in the ink compositions, including pigment, dye, mixtures of pigment and dye, mixtures of pigments, mixtures of dyes, and the like. In embodiments, the colorant used in the ink composition consists entirely of the formed fluorescent nanoparticles. However, in other embodiments fluorescent nanoparticles may be used in combination with one or more conventional or other colorant material, where the fluorescent nanoparticle compositions may form substantially most of the colorant material (such as about 90% or about 95% by weight or more), they may form a majority of the colorant material (such as at least 50% by weight or more), or they may form a minority of the colorant material (such as less than about 50% by weight). For the end-use application in piezoelectric inkjet printing, fluorescent nanoparticles are advantageous to ensure reliable inkjet printing and prevent blockage of jets due to pigment particle agglomeration. A useful method to characterize a pigmented ink's or dispersion's stability is to assess the filterability of said ink or dispersion past a filter, such as a glass fiber filter. Further to this, it is useful to assess the filterability of said ink or dispersion past a filter with an absolute rating that has a high BETA rating, such as a BETA 5000 rating. A 2 micron absolute-rated filter having a BETA-5000 rating, for instance, implies that only 1 particle at or greater than 2 microns in size passes through the filter for every 5000 particles at or greater than 2 microns retained by the filter.

In embodiments, it is useful to have dispersions or inks that may filter quickly and linearly or near-linearly past filters having absolute ratings of less than about 2 microns and are classified as BETA-5000-rated filters. In other embodiments, it is useful to have dispersions or inks that may filter quickly and linearly or near-linearly past filters having absolute ratings of less than about 1 microns and are classified as BETA-5000-rated filters. In still other embodiments, it is useful to have dispersions or inks that may filter quickly and linearly or near-linearly past filters having absolute ratings of less than about 0.45 microns and are classified as BETA-5000-rated filters.

It is desirable, in embodiments, that printing inks, for example, piezo inkjet inks, be filterable past a suitably sized filter with a high BETA filter rating, such as BETA-5000 filter, such that unwanted agglomerates or poorly dispersed pigment particles present in the ink may be removed from said ink greatly improving upon the jetting reliability of the ink.

In fluorescent nanoparticles are advantageous for offering enhanced color properties in printed images, since in embodiments the color properties of nanoscale fluorescent pigment particles and/or fluorescent organic nanoparticles were tunable with particle size, whereby as average particle size ($d_{50}$) was decreased to nanometer-scale, the hue angles were shifted from yellowish-red hues to bluish-red hues by an amount ranging from about 5 to 35° in the color gamut space.

In still other embodiments, fluorescent nanoparticles compositions may be included in the ink composition in any other varying amount, to provide either colorant and/or other properties to the ink composition.

The colorant, such fluorescent nanoparticle compositions in embodiments, may be present in the ink composition in any desired or effective amount to obtain the desired color or hue. For example, the colorant may typically be present in an amount of at least about 0.1 percent by weight of the ink, such as at least about 0.2 percent by weight of the ink or at least about 0.5 percent by weight of the ink, and typically no more than about 50 percent by weight of the ink, such as no more than about 20 percent by weight of the ink or no more than about 10 percent by weight of the ink, although the amount may be outside of these ranges.

The ink compositions may also optionally contain an antioxidant. The optional antioxidants of the ink compositions protect the images from oxidation and also protect the ink components from oxidation during the heating portion of the ink preparation process. Specific examples of suitable antioxidants include NAUGUARD® series of antioxidants, such as NAUGUARD® 445, NAUGUARD® 524, NAUGUARD® 76, and NAUGUARD® 512 (commercially available from Uniroyal Chemical Company, Oxford, Conn.), the IRGANOX® series of antioxidants such as IRGANOX® 1010 (commercially available from Ciba Geigy), and the like. When present, the optional antioxidant may be present in the ink in any desired or effective amount, such as in an amount of from at least about 0.01 to about 20 percent by weight of the ink, such as about 0.1 to about 5 percent by weight of the ink, or from about 1 to about 3 percent by weight of the ink, although the amount may be outside of these ranges.

The ink compositions may also optionally contain a viscosity modifier. Examples of suitable viscosity modifiers include aliphatic ketones, such as stearone, and the like. When present, the optional viscosity modifier may be present in the ink in any desired or effective amount, such as about 0.1 to about 99 percent by weight of the ink, such as about 1 to about 30 percent by weight of the ink, or about 10 to about 15 percent by weight of the ink, although the amount may be outside of these ranges.

Other optional additives to the inks include clarifiers, such as UNION CAMP® X37-523-235 (commercially available from Union Camp); tackifiers, such as FORAL® 85, a glycerol ester of hydrogenated abietic (rosin) acid (commercially available from Hercules), FORAL® 105, a pentaerythritol ester of hydroabietic (rosin) acid (commercially available from Hercules), CELLOLYN® 21, a hydroabietic (rosin) alcohol ester of phthalic acid (commercially available from Hercules), ARAKAWA KE-311 Resin, a triglyceride of hydrogenated abietic (rosin) acid (commercially available from Arakawa Chemical Industries, Ltd.), synthetic polyterpene resins such as NEVTAC® 2300, NEVTAC® 100, and NEVTAC® 80 (commercially available from Neville Chemical Company), WINGTACK® 86, a modified synthetic polyterpene resin (commercially available from Goodyear), and the like; adhesives, such as VERSAMID® 757, 759, or 744 (commercially available from Henkel), plasticizers, such as UNIPLEX® 250 (commercially available from Uniplex), the phthalate ester plasticizers commercially available from Monsanto under the trade name SANTICIZER®3, such as dioctyl phthalate, diundecyl phthalate, alkylbenzyl phthalate (SANTICIZER® 278), triphenyl phosphate (commercially available from Monsanto), KP-140®, a tributoxyethyl phosphate (commercially available from FMC Corporation), MORFLEX® 150, a dicyclohexyl phthalate (commercially available from Morflex Chemical Company Inc.), trioctyl trimellitate (commercially available from Eastman Kodak Co.), and the like; and the like. Such additives may be included in conventional amounts for their usual purposes.

The ink composition also includes a carrier material, or mixture of two or more carrier materials. The carrier material may vary, for example, depending upon the specific type of ink composition. For example, suitable solvents and carrier materials include those discussed above.

In the case of a radiation, such as ultraviolet light, curable ink composition, the ink composition comprises a carrier material that is typically a curable monomer, curable oligomer, or curable polymer, or a mixture thereof. The curable materials are typically liquid at 25° C. The curable ink composition may further include other curable materials, such as a curable wax or the like, in addition to the colorant and other additives described above.

The term "curable" refers, for example, to the component or combination being polymerizable, that is, a material that may be cured via polymerization, including for example free radical routes, and/or in which polymerization is photoinitiated though use of a radiation sensitive photoinitiator. Thus, for example, the term "radiation curable" is intended to cover all forms of curing upon exposure to a radiation source, including light and heat sources and including in the presence or absence of initiators. Example radiation curing routes include, but are not limited to, curing using ultraviolet (UV) light, for example having a wavelength of 200-400 nm or more rarely visible light, such as in the presence of photoinitiators and/or sensitizers, curing using e-beam radiation, such as in the absence of photoinitiators, curing using thermal curing, in the presence or absence of high temperature thermal initiators (and which are generally largely inactive at the jetting temperature), and appropriate combinations thereof.

Suitable radiation, such as UV, curable monomers and oligomers include, but are not limited to, acrylated esters, acrylated polyesters, acrylated ethers, acrylated polyethers, acrylated epoxies, urethane acrylates, and pentaerythritol tetraacrylate. Specific examples of suitable acrylated oligomers include, but are not limited to, acrylated polyester oligomers, such as CN2262 (Sartomer Co.), EB 812 (Cytec Surface Specialties), EB 810 (Cytec Surface Specialties), CN2200 (Sartomer Co.), CN2300 (Sartomer Co.), and the like, acrylated urethane oligomers, such as EB270 (UCB Chemicals), EB 5129 (Cytec Surface Specialties), CN2920 (Sartomer Co.), CN3211 (Sartomer Co.), and the like, and acrylated epoxy oligomers, such as EB 600 (Cytec Surface Specialties), EB 3411 (Cytec Surface Specialties), CN2204 (Sartomer Co.), CN110 (Sartomer Co.), and the like; and pentaerythritol tetraacrylate oligomers, such as SR399LV (Sartomer Co.) and the like. Specific examples of suitable acrylated monomers include, but are not limited to, polyacrylates, such as trimethylol propane triacrylate, pentaerythritol tetraacrylate, pentaerythritol triacrylate, dipentaerythritol pentaacrylate, glycerol propoxy triacrylate, tris(2-hydroxyethyl)isocyanurate triacrylate, pentaacrylate ester, and the like, epoxy acrylates, urethane acrylates, amine acrylates, acrylic acrylates, and the like. Mixtures of two or more materials may also be employed as the reactive monomer. Suitable reactive monomers are commercially available from, for example, Sartomer Co., Inc., Henkel Corp., Radcure Specialties, and the like.

In embodiments, the at least one radiation curable oligomer and/or monomer may be cationically curable, radically curable, or the like.

The radiation curable monomer or oligomer variously functions as a viscosity reducer, as a binder when the composition is cured, as an adhesion promoter, and as a crosslinking agent, for example. Suitable monomers may have a low molecular weight, low viscosity, and low surface tension and comprise functional groups that undergo polymerization upon exposure to radiation such as UV light.

In embodiments, the monomer is equipped with one or more curable moieties, including, but not limited to, acrylates; methacrylates; alkenes; allylic ethers; vinyl ethers; epoxides, such as cycloaliphatic epoxides, aliphatic epoxides, and glycidyl epoxides; oxetanes; and the like. Examples of suitable monomers include monoacrylates, diacrylates, and polyfunctional alkoxylated or polyalkoxylated acrylic monomers comprising one or more di- or tri-acrylates. Suitable monoacrylates are, for example, cyclohexyl acrylate, 2-ethoxy ethyl acrylate, 2-methoxy ethyl acrylate, 2(2-ethoxyethoxy)ethyl acrylate, stearyl acrylate, tetrahydrofurfuryl acrylate, octyl acrylate, lauryl acrylate, behenyl acrylate, 2-phenoxy ethyl acrylate, tertiary butyl acrylate, glycidyl acrylate, isodecyl acrylate, benzyl acrylate, hexyl acrylate, isooctyl acrylate, isobornyl acrylate, butanediol monoacrylate, ethoxylated phenol monoacrylate, oxyethylated phenol acrylate, monomethoxy hexanediol acrylate, beta-carboxy ethyl acrylate, dicyclopentyl acrylate, carbonyl acrylate, octyl decyl acrylate, ethoxylated nonylphenol acrylate, hydroxyethyl acrylate, hydroxyethyl methacrylate, and the like. Suitable polyfunctional alkoxylated or polyalkoxylated acrylates are, for example, alkoxylated, such as ethoxylated or propoxylated, variants of the following: neopentyl glycol diacrylates, butanediol diacrylates, trimethylolpropane triacrylates, glyceryl triacrylates, 1,3-butylene glycol diacrylate, 1,4-butanediol diacrylate, diethylene glycol diacrylate, 1,6-hexanediol diacrylate, tetraethylene glycol diacrylate, triethylene glycol diacrylate, tripropylene glycol diacrylate, polybutanediol diacrylate, polyethylene glycol diacrylate, propoxylated neopentyl glycol diacrylate, ethoxylated neopentyl glycol diacrylate, polybutadiene diacrylate, and the like.

In embodiments, the ink composition includes at least one reactive monomer and/or oligomer. However, other embodiments may include only one or more reactive oligomers, only one or more reactive monomers, or a combination of one or more reactive oligomers and one or more reactive monomers. However, in embodiments, the composition includes at least one reactive (curable) monomer, and optionally one or more additional reactive (curable) monomers and/or one or more reactive (curable) oligomers.

The curable monomer or oligomer in embodiments is included in the ink in an amount of, for example, about 20 to about 90% by weight of the ink, such as about 30 to about 85% by weight of the ink, or about 40 to about 80% by weight of the ink. In embodiments, the curable monomer or oligomer has a viscosity at 25° C. of about 1 to about 50 cP, such as about 1 to about 40 cP or about 10 to about 30 cP. In one embodiment, the curable monomer or oligomer has a viscosity at 25° C. of about 20 cP. Also, in some embodiments, it is desired that the curable monomer or oligomer is not a skin irritant, so that printed images using the ink compositions are not irritable to users.

When a curable wax is included, the curable wax may be any wax component that is miscible with the other components and that will polymerize with the curable monomer or oligomer to form a polymer. The term "wax" includes, for example, any of the various natural, modified natural, and synthetic materials commonly referred to as waxes. A wax is generally solid at room temperature (about 20° C.), specifically at 25° C. Inclusion of the wax promotes an increase in viscosity of the ink as it cools from the jetting temperature. The wax also acts to lower the gloss of the resultant image from a value that would otherwise be provided in the absence of the curable wax. The curable wax thus provides a more matte or less glossy image.

Suitable examples of curable waxes include, but are not limited to, those waxes that include or are functionalized with curable groups. The curable groups may include, for example, acrylate, methacrylate, alkene, allylic ether, epoxide, oxetane, and the like. These waxes may be synthesized by the reaction of a wax equipped with a transformable functional group, such as carboxylic acid or hydroxyl.

Suitable examples of hydroxyl-terminated polyethylene waxes that may be functionalized with a curable group include, but are not limited to, mixtures of carbon chains with the structure $CH_3-(CH_2)_n-CH_2OH$, where there is a mixture of chain lengths, n, where the average chain length may be in the range of about 16 to about 50, and linear low molecular weight polyethylene, of similar average chain length. Suitable examples of such waxes include, but are not limited to: the UNILIN® series of materials such as UNILIN® 350, UNILIN® 425, UNILIN® 550 and UNILIN® 700 with $M_n$ approximately equal to 375, 460, 550 and 700 g/mol, respectively. All of these waxes are commercially available from Baker-Petrolite. Guerbet alcohols, characterized as 2,2-dialkyl-1-ethanols, are also suitable compounds. Exemplary Guerbet alcohols include those containing about 16 to about 36 carbons, many of which are commercially available from Jarchem Industries Inc., Newark, N.J. PRIPOL® 2033 (C-36 dimer diol mixture including isomers of the formula

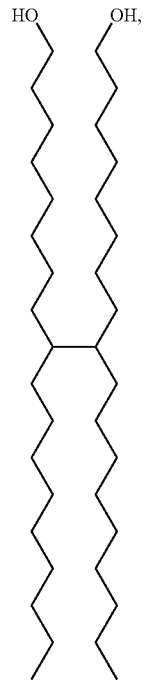

as well as other branched isomers that may include unsaturations and cyclic groups, available from Uniqema, New Castle, Del.; further information on $C_{36}$ dimer diols of this type is disclosed in, for example, "Dimer Acids," *Kirk-Othmer Encyclopedia of Chemical Technology*, Vol. 8, 4$^{th}$ Ed. (1992), pp. 223 to 237, the disclosure of which is totally incorporated herein by reference) may also be used. These alcohols may be reacted with carboxylic acids equipped with UV curable moieties to form reactive esters. Examples of these acids include acrylic and methacrylic acids, available from Sigma-Aldrich Co. In embodiments, suitable curable monomers include waxy acrylates, such as acrylates of UNILIN® 350, UNILIN® 425, UNILIN® 550 and UNILIN® 700.

Suitable examples of carboxylic acid-terminated polyethylene waxes that may be functionalized with a curable group include mixtures of carbon chains with the structure $CH_3$—$(CH_2)_n$—COOH, where there is a mixture of chain lengths, n, where the average chain length is about 16 to about 50, and linear low molecular weight polyethylene, of similar average chain length. Suitable examples of such waxes include, but are not limited to, UNICID® 350, UNICID® 425, UNICID® 550 and UNICID®B 700 with M, equal to approximately 390, 475, 565 and 720 g/mol, respectively. Other suitable waxes have a structure $CH_3$—$(CH_2)_n$—COOH, such as hexadecanoic or palmitic acid with n=14, heptadecanoic or margaric or daturic acid with n=15, octadecanoic or stearic acid with n=16, eicosanoic or arachidic acid with n=18, docosanoic or behenic acid with n=20, tetracosanoic or lignoceric acid with n=22, hexacosanoic or cerotic acid with n=24, heptacosanoic or carboceric acid with n=25, octacosanoic or montanic acid with n=26, triacontanoic or melissic acid with n=28, dotriacontanoic or lacceroic acid with n=30, tritriacontanoic or ceromelissic or psyllic acid, with n=31, tetratriacontanoic or geddic acid with n=32, pentatriacontanoic or ceroplastic acid with n=33. Guerbet acids, characterized as 2,2-dialkyl ethanoic acids, are also suitable compounds. Exemplary Guerbet acids include those containing 16 to 36 carbons, many of which are commercially available from Jarchem Industries Inc., Newark, N.J. PRIPOL® 1009 (C-36 dimer acid mixture including isomers of the formula

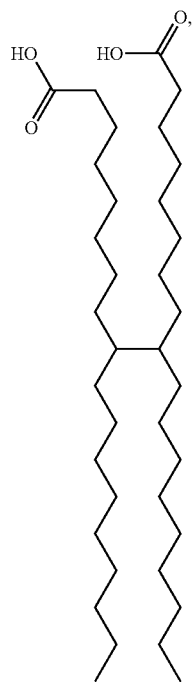

as well as other branched isomers that may include unsaturations and cyclic groups, available from Uniqema, New Castle, Del.; further information on $C_{36}$ dimer acids of this type is disclosed in, for example, "Dimer Acids," *Kirk-Othmer Encyclopedia of Chemical Technology*, Vol. 8, 4th Ed. (1992), pp. 223 to 237, the disclosure of which is totally incorporated herein by reference) may also be used. These carboxylic acids may be reacted with alcohols equipped with UV curable moieties to form reactive esters. Examples of these alcohols include, but are not limited to, 2-allyloxyethanol from Sigma-Aldrich Co.;

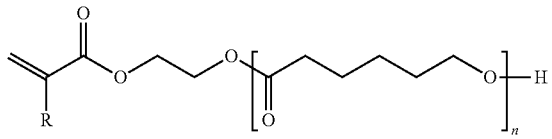

TONE M-101 (R=H, $n_{avg}$=1), TONE M-100 (R=H, $n_{avg}$=2) and TONE M-201 (R=Me, $n_{avg}$=1) from The Dow Chemical Company; and

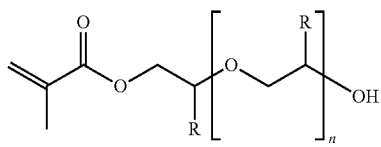

CD572 (R=H, n=10) and SR604 (R=Me, n=4) from Sartomer Company, Inc.

The curable wax may be included in the ink composition in an amount of from, for example, about 1 to about 25% by weight of the ink, such as about 2 or about 5 to about 10 or about 15% by weight of the ink. In an embodiment, the curable wax may be included in the ink composition in an amount of from about 6 to about 10% by weight of the ink, such as about 8 to about 9% by weight of the ink.

Also in embodiments, the composition further comprises an initiator, such as a photoinitiator, that initiates polymerization of curable components of the ink, including the curable monomer and the curable wax. The initiator should be soluble in the composition. In embodiments, the initiator is a UV-activated photoinitiator.

In embodiments, the initiator may be a radical initiator. Examples of suitable radical photoinitiators include ketones such as hydroxycyclohexylphenyl ketones, benzyl ketones, monomeric hydroxyl ketones, polymeric hydroxyl ketones, α-amino ketones, and 4-(2-hydroxyethoxy)phenyl-(2-hydroxy-2-propyl)ketone; benzoins; benzoin alkyl ethers; acyl phosphine oxides, metallocenes, benzophenones, such as 2,4,6-trimethylbenzophenone and 4-methylbenzophenone; trimethylbenzoylphenylphosphine oxides such as 2,4,6-trimethylbenzoyl-diphenyl-phosphine oxide; azo compounds; anthraquinones and substituted anthraquinones, such as, for example, alkyl substituted or halo substituted anthraquinones; other substituted or unsubstituted polynuclear quinines; acetophenones, thioxanthones; ketals; acylphosphines; thioxanthenones, such as 2-isopropyl-9H-thioxanthen-9-one; mixtures thereof, and the like. One suitable ketone is 1-[4-(2-hydroxyethoxy)-phenyl]-2-hydroxy-2-methyl-1-propane-1-one. In an embodiment, the ink contains an α-amino ketone, 1-[4-(2-hydroxyethoxy)-phenyl]-2-hydroxy-2-methyl-1-propane-1-one and 2-isopropyl-9H-thioxanthen-9-one. In another embodiment, the photoinitiator is one of the following compounds or a mixture thereof: a hydroxycyclohexylphenyl ketone, such as, for example, 1-hydroxycyclohexylphenyl ketone, such as, for example, Irgacure® 184 (Ciba-Geigy Corp., Tarrytown, N.Y.), having the structure:

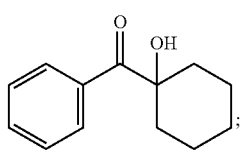

a trimethylbenzoylphenylphosphine oxide, such as, for example, ethyl-2,4,6-trimethylbenzoylphenylphosphinate, such as, for example, Lucirin® TPO-L (BASF Corp.), having the formula

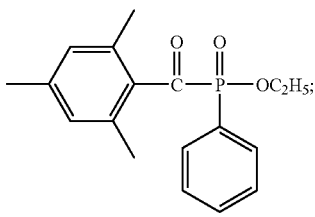

a mixture of 2,4,6-trimethylbenzophenone and 4-methylbenzophenone, such as, for example, SARCURE™ SR1137 (Sartomer); a mixture of 2,4,6-trimethylbenzoyl-diphenylphosphine oxide and 2-hydroxy-2-methyl-1-phenyl-propan-1-one, such as, for example, DAROCUR® 4265 (Ciba Specialty Chemicals); alpha-amino ketone, such as, for example, IRGACURE® 379 (Ciba Specialty Chemicals); 4-(2-hydroxyethoxy)phenyl-(2-hydroxy-2-propyl)ketone, such as, for example, IRGACURE® 2959 (Ciba Specialty Chemicals); 2-isopropyl-9H-thioxanthen-9-one, such as, for example, DAROCUR® ITX (Ciba Specialty Chemicals); and mixtures thereof.

In other embodiments, the initiator may be a cationic initiator. Examples of suitable cationic photoinitiators include aryldiazonium salts, diaryliodonium salts, triarysulfonium salts, triarylselenonium salts, dialkylphenacylsulfonium salts, triarylsulphoxonium salts and aryloxydiarylsulfonium salts.

The total amount of initiator included in the ink may be, for example, about 0.5 to about 15%, such as about 1 to about 10%, by weight of the ink.

The ink may also optionally contain at least one gellant. The gellant may be included, for example, to control the viscosity of the ink composition before and/or after jetting. For example, suitable gellants include a curable gellant comprised of a curable polyamide-epoxy acrylate component and a polyamide component, a curable composite gellant comprised of a curable epoxy resin and a polyamide resin, and the like.

Suitable curable composite gellants include those described in U.S. Pat. Nos. 6,492,458 and 6,399,713, and U.S. Patent Publications Nos. US 2003/0065084, US 2007/0120921, and US 2007/0120924, the entire disclosures of which are incorporated herein by reference. The ink compositions may include the gellant in any suitable amount, such as about 1% to about 50% by weight of the ink. In embodiments, the gellant may be present in an amount of about 2% to about 20% by weight of the ink, such as about 5% to about 15% by weight of the ink, although the value may also be outside of this range.

In the uncured state, the radiation-curable ink composition in embodiments is a low viscous liquid and is readily jettable. For example, in embodiments, the ink has a viscosity of from about 5 mPa-s to about 20 mPa-s, such as from about 8 mPa-s to about 12 mPa-s, at a temperature between about 60° C. and about 100° C. In embodiments, the ink has a viscosity of from about $10^5$ to about $10^7$ mPa-s at a temperature of about 50° C. or below, such as at a temperature from about 0° C. to about 50° C. Upon exposure to a suitable source of curing energy, e.g., ultraviolet light, electron beam energy, or the like, the photoinitiator absorbs the energy and sets into motion a reaction that converts the liquid composition into a cured material. The monomer and/or oligomer in the composition contain functional groups that polymerize during exposure to the curing source to readily crosslink forming a polymer network. This polymer network provides printed image with, for example, durability, thermal and light stability, and scratch and smear resistance. Thus, the composition is particularly well-suited for ink-based images printed on substrates that may be subjected to heat or sunlight, because the composition provides a printed image that is resistant to cracking and fading and provides image permanence.

In embodiments, the radiation-curable ink composition may include a water-soluble or dispersable radiation-curable materials, such as polyethylene glycol diacrylates, ethoxylated trimethylolpropane triacrylate, ethoxylated bisphenol A diacrylates, UCECOAT waterborne UV curable resins available from Cytec Surface Specialties. Water dispersible photoinitiators may include Esacure DP250 available from Lamberti SpA. Optional dispersing agents include EFKA® 7431 and EFKA® 4340 available from Ciba Specialty Chemicals.

The ink compositions may also optionally contain other materials, which may depend upon the type of printer in which the ink is used. For example, the carrier composition is typically designed for use in either a direct printing mode or an indirect or offset printing transfer system.

The ink compositions of the present disclosure may be prepared by any desired or suitable method. For example, the ink ingredients may be mixed together, followed by heating, typically to a temperature of from about ambient temperature such as about 20 to about 25° C. to about 100° C., although the temperature may be outside of this range, and stirring and\or agitating until a homogeneous ink composition is obtained, followed by cooling the ink to ambient temperature where it is applicable (typically from about 20 to about 25° C.

In embodiments the radiation-curable ink composition may be prepared without gellant and/or wax or both. In such embodiments, lower temperatures, such as room temperature may be utilized for preparation and printing. Thus, the composition is particularly well-suited for printing conditions conducted at lower temperatures, such as room temperature. Thus, ink-based images on substrates may be produced with less energy consumption.

An example is set forth herein below and is illustrative of different compositions and conditions that may be utilized in practicing the disclosure. All proportions are by weight unless otherwise indicated. It will be apparent, however, that the disclosure may be practiced with many types of compositions and may have many different uses in accordance with the disclosure above and as pointed out hereinafter.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

EXAMPLES

Example 1

Preparation of Nanoscale Fluorescent Pigment Particles
Synthesis of the Fluorescent Pigment
Benzo[k,l]thioxanthene-3,4-dicarboxylic Anhydride In a 200 mL 3-neck round bottom flask fitted with magnetic stirrer, reflux condenser and oil bath were introduced 4 g (0.016 mol) 4-nitronaphthalene tetracarboxylic anhydride, 3 mL (0.03 mol) 2-amino-benzenethiol and 40 mL N,N-dimethyl formamide. A dark brown solution resulted. I-Amyl nitrite, 3.2 mL (0.024 mol) was added slowly, via a syringe into the flask. The temperature of the reaction mixture rose to 80° C., and an orange precipitate formed. At the end of the addition, the temperature in the flask was allowed to drop to 60° C. The reaction mixture was then stirred at this temperature for 3 hours to insure completion of the reaction. The solid was filtered through a fritted glass and washed with N,N-dimethyl formamide twice, and once with N,N-dimethyl formamide:distilled water with a weight ratio of 1:1 until the washings were clear. The orange solid was dried in a vacuum oven at 100° C. overnight. Infrared Spectrometry using a KBr pellet resulted in the following data: double anhydride C=O peak at 1758 $cm^{-1}$ and 1721 $cm^{-1}$. The average particle size from Transmission Electron Microscopy was greater than 2 μm in length and many of the particles had a particle width greater than 500 nm.

Formation of Nanoscale Fluorescent Pigment Particles with SPAN 40.

In a 500 mL resin kettle fitted with mechanical stirring, dropping funnel and ice/water cooling bath were introduced 300 mL N-methyl-2-pyrrolidinone and 2.6 g (0.006 mol) SPAN 40. To this solution was added dropwise over a period of 15 minutes a solution of 30 mL sulfuric acid containing 0.5 g (0.002 mol) benzothioxanthene and 0.050 g (0.0001 mol) perylene tetracarboxylic dianhydride. During the addition, the temperature in the resin kettle rose to 40° C. At the end of the addition, the reaction mixture was allowed to stir at room temperature for 30 minutes. The thick mixture was diluted with 500 mL isopropanol:distilled water with a weight ratio of 2:1. The resulted mixture was filtered using a fritted glass. The pigment was washed on the frit twice with 20 mL isopropanol and once with 20 mL isopropanol. Infrared Spectrometry using a KBr pellet resulted in the following data: double anhydride C=O peak at 1758 $cm^{-1}$ and 1721 $cm^{-1}$. The particle size from Transmission Electron Microscopy (wet cake) was 100-500 nm in length and less than 100 nm width.

Formation of Nanoscale Fluorescent Pigment Particles with Oleic Acid.

In a 500 mL resin kettle fitted with mechanical stirring, dropping funnel and ice/water cooling bath were introduced 300 mL N-methyl-2-pyrrolidinone and 4.9 g (0.02 mol) oleic acid. To this solution was added dropwise over a period of 15 minutes a solution of 30 mL sulfuric acid containing 0.5 g (0.002 mol) benzothioxanthene and 0.050 g (0.0001 mol) perylene tetracarboxylic dianhydride. During the addition, the temperature in the resin kettle rose to 40° C. At the end of the addition, the reaction mixture was allowed to stir at room temperature for 30 minutes. The thick mixture was diluted with 500 mL isopropanol:distilled water with a weight ratio of 2:1. The resulted mixture was separated using a centrifuge. The pigment particles were washed through centrifugation once with distilled water and once with acetone. Infrared Spectrometry using a KBr pellet resulted in the following data: double anhydride C=O peak at 1758 $cm^{-1}$ and 1721 $cm^{-1}$. The particle size from Transmission Electron Microscopy (wet cake) was 100-500 nm in length and less than 100 nm in width.

The fabricated nanoscale fluorescent pigment particles had a needle like shape with a 100-500 nm in length and less than 100 nm in width. They were green-yellow fluorescent under UV light. The melting temperature of the initial pigment is about 320° C. As a result no leaking or melting of the fluorescent nanoparticles is expected to take place when heated for extended periods of time at 120° C. in the solid ink printer.

Example 2

Fluorescent Organic Nanoparticles Obtained by Modified Emulsion Aggregation Latex Process (1) Preparation of Polyester Latex.

190 grams of amorphous propoxylated bisphenol A fumarate resin (Mw=12,500, Tg onset=56.9, acid value=16.7; available commercially as SPAR™ resins from Reichhold Chemicals, Inc., RESAPOL HT resin from Resana S. A. along with 10 grams (g) of DFKY-C7 (Risk Reactor) fluorescent dye were weighed out in a 1 L kettle. 100 g of methyl ethyl ketone and 40 g of isopropanol were weighed out separately and mixed together in a beaker. The solvents were poured into the 1 L kettle containing the resin. The kettle, with its cover on, a gasket, a condenser and 2 rubber stoppers, were placed inside a water bath set at 48° C. for 1 hour. The anchor blade impeller was set up in the kettle and was switched on to rotate at approximately 150 RPM. After 3 hours, when all of the resins dissolved, 8.69 g of 10% $NH_4OH$ was added to the mixture drop-wise with a disposable pipette through a rubber stopper. The mixture was left to stir for 10 minutes. Then 8.0 g of Vazo 52 thermal initiator was added to the mixture and the mixture was stirred for an additional 10 minutes at 48° C. Next, 600 g of de-ionized water was to be added into the kettle by a pump through a rubber stopper. The first 400 g were added in 90 minutes with the pump set to a rate of 4.44 g/min. The last 200 g were added in 30 minutes with the pump set to 6.7 g/min. The apparatus was dismantled, and the mixture was poured into a glass pan, which was kept in the fume hood overnight and stirred by a magnetic stir-bar so that the solvent could evaporate off. When exposed to black light, the latex emitted red light. The particle size as measured by a Nicomp Particle Analyzer was 170 nm. This latex solution was labeled "Latex A."

(2) Preparation of Hard Particles by Crosslinking by Radical Initiation.

The above latex solution, Latex A, was charged into a 1 L 3-necked round bottom flask and purged with nitrogen gas for one hour. The mixture was then stirred at 200 RPM and heated to 80° C. and maintained at that temperature for 5 hours. At this temperature, the Vazo 52 initiator produced radicals which initiated a crosslinking reaction between the double bonds of the propoxylated bisphenol A fumarate resin. The latex was then cooled down and freeze-dried to obtain dry particles. When exposed to black light (under UV light the latex emitted red light. The size of the particles after the crosslinking reaction was 145 nm.

These particles contain the fluorescent dye dispersed into the polyester. The polyester material which constitutes the particles binder is not miscible with solid ink composition and as a result leaching of the dye outside the particles is essentially eliminated. This prevents dye degradation due to interaction with solid ink base components.

Example 3

Fluorescent Organic Nanoparticles Obtained by Emulsion-Polymerization

A surfactant solution consisting of 3.0 g of Neogen RK (anionic emulsifier) and 250 g de-ionized water was prepared by mixing for 10 minutes in a stainless steel holding tank. The holding tank was then purged with nitrogen for 5 minutes before transferring into the reactor. The reactor was then continuously purged with nitrogen while being stirred at 300 RPM. The reactor was then heated up to 76° C. at a controlled rate and held constant. In a separate container, 2.13 g of ammonium persulfate initiator was dissolved in 22 g of de-ionized water. Also in a second separate container, the monomer emulsion was prepared in the following manner. 125 g of methylmethacrylate, 5 g of diethyleneglycol dimethacrylate, 6.4 g of DFKY-C7 Fluorescent Dye (Risk Reactor), 7 g Neogen RK (anionic surfactant), and 135 g of deionized water were mixed to form an emulsion. One percent of the above emulsion was then slowly fed into the reactor containing the aqueous surfactant phase at 76° C. to form the "seeds" while being purged with nitrogen. The initiator solution was then slowly charged into the reactor and after 20 minutes the rest of the emulsion was continuously fed in using metering pump at a rate of 0.6%/minute. Once all the monomer emulsion was charged into the main reactor, the temperature was held at 76° C. for an additional 2 hours to complete the reaction. Full cooling was then applied and the reactor temperature is reduced to 35° C. The product was collected into a holding tank after filtration through a 1 micron filter bag. After drying a portion of the latex the onset Tg was observed to be 105.7° C. The average particle size of the latex as measured by Disc Centrifuge was 73 nm. The particles are red fluorescent under UV light.

Example 4

Radiation-Curable Ink Compositions Containing Fluorescent Nanoparticles

Preparation of a Fluorescent Pigmented Free Radical UV Ink.

10 g of a composition found in Table 1 were transferred to a clean and dry 30 mL bottle and heated to 85° C. To this were added 0.08 g of a fluorescent pigment from Example 1 and gently stirred with a mini-spatula to encourage wetting of the pigment particles in the free radical UV vehicle. The dispersion was then energized with a Branson Sonifier 450 at power level of 3, 90% duty cycle for 3 minutes to effect dispersion of the fluorescent pigment into the cationic UV vehicle to form a fluorescent pigmented free radical UV ink.

Example 5

Coating and Thermal Curing

An aliquot of the ink from Example 1 was coated onto a 4 mil thick Clear Mylar® sheet using an 8-path wet film applicator such that the wet thickness of the coating was 0.5 mil. One portion of the coating was transferred to an oven at 140° C. for 1 hour while another portion of the coating was transferred an oven at 140° C. for 18 hours. While some tack was observed for the portion of coating dried for 1 hour, no tack was observed for the portion of coating dried for 18 hours indicating that thermal curing of the coating had occurred. Both coatings exhibited a high degree of fluorescence while subjected to radiation from an UVA lamp.

TABLE 1

Composition of Fluorescent Pigmented Free Radical UV Ink (Example 1).

| wt % | Component |
|---|---|
| 7.5 | Amide gallant (see paragraph [0178]) |
| 5 | Unilin 350 (see paragraph [0145]) |
| 3 | Irgacure 379 |
| 2 | Darocur ITX |
| 1 | Irgacure 819 |
| 3.5 | Irgacure 127 |
| 0.2 | Irgastab UV10 |
| 77 | SR9003 |
| 0.8 | Fluorescent Pigment, Example 1 |

Example 6

Preparation of a Fluorescent Pigmented Cationic UV Ink

A radiation-curable ink is prepared in the following manner. To a clean and dry 30 mL bottle with a stirrer bar are added: 4.0 g Cyracure® UVR-6105 available from Dow Chemical Company, 3.0 g Cyracure® UVR-6000 available from Dow Chemical Company, 2.5 g VEctomer® 3010 available from Morfiex Inc., 0.02 g BYK® 3510 available from Byk-Chemie. The mixture is then heated to 50° C. on a hot plate stirrer and then mixed so the components form a solution. Next, 0.36 g and 0.07 g of Irgacure® 250 and Darocur® ITX, respectively, both available from Ciba-Geigy, Inc, are added with continued stirring at 50° C. to effect dissolution of the photoinitiator and photosensitizer. After the stirrer bar is carefully removed from the solution, 0.05 g of a fluorescent pigment, from Example 1, are added to the solution and gently stirred with a mini-spatula to encourage wetting of the pigment particles in the cationic UV vehicle. The dispersion is then energized with a Branson Sonifier 450 at power level of 3, 90% duty cycle for 3 minutes to effect dispersion of the fluorescent pigment into the cationic UV vehicle to form a fluorescent pigmented cationic UV ink. The pigment, readily dispersed in the ink, is filtered past a 1 μm glass fiber filter from Pall Corporation.

The composition of the ink made in Example 1 appears in Table 2.

TABLE 2

Composition of Fluorescent Pigmented Cationic UV Ink

| wt % | Component |
|---|---|
| 40 | Cyracure UVR-6105 |
| 30 | Cyracure UVR-6000 |
| 25 | VEctomer ® 3010 |
| 0.5 | Fluorescent Pigment, Example 1 |
| 3.6 | Irgacure 250 |
| 0.7 | Darocur ITX |
| 0.2 | BYK 3510 |

Example 7

Coating and Curing

An aliquot of the ink from Example 6 was coated onto an Aluminum sheet using an 8-path wet film applicator such that the wet thickness of the coating was 0.5 mil. The coating was then transferred to a UV Fusion LC-6B Benchtop Conveyor equipped with UV Fusion Light Hammer 6 Ultraviolet Lamp System employing a "D" bulb such that the dosage time was about 5 seconds and the irradiances in UVA, UVB, UVC and visible spectra were 3.7, 1.1, 0.09, and 2.1 W/cm$^2$. The resultant cured film is uniform and tack-free. The coating exhibits a high degree of fluorescence while subjected to radiation from an UVA lamp.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A radiation curable ink composition comprising:
   a radiation curable material that is capable of being cured via polymerization,
   a polymeric dispersant selected from the group consisting of derivatives of rosin natural products, acrylic-based polymers, styrene-based copolymers, copolymers of α-olefins, copolymers of vinyl pyridine, vinyl imidazole, vinyl pyrrolidinone, polyester copolymers, polyamide copolymers, and copolymers of vinyl acetals, and
   a fluorescent nanoparticle composition comprising at least one nanoscale fluorescent pigment particle and/or at least one fluorescent organic nanoparticle.

2. The composition of claim 1, wherein the radiation curable material that is capable of being cured via polymerization is present in an amount of about 20 to about 90 weight percent, and the fluorescent nanoparticle composition is present in an amount of about 0.1 to about 50 weight percent, with respect to the total weight of the ink composition.

3. The composition of claim 1, wherein the polymeric dispersant is selected from the group consisting of copolymers of 1-hexadecene, copolymers of 1-octadecene, copolymers of 1-eicosene, copolymers of 1-triacontene, poly(vinyl butyral-co-vinyl alcohol-co-vinyl acetate), poly(vinyl acetate), poly(acrylic acid), poly(methacrylic acid), poly(vinyl alcohol), poly(methyl methacrylate), polyester, polycarbonate, poly(styrene-b-4-vinylpyridine), and mixtures thereof.

4. The composition of claim 1, wherein the radiation curable material that is capable of being cured via polymerization is selected from the group consisting of a curable monomer, a curable oligomer, a curable polymer, and mixtures thereof.

5. The composition of claim 1, wherein the radiation curable material that is capable of being cured via polymerization is selected from the group consisting of acrylated esters, acrylated polyesters, acrylated ethers, acrylated polyethers, acrylated epoxies, urethane acrylates, pentaerythritol tetraacrylate, polyacrylates, amine acrylates, and mixtures thereof.

6. The composition of claim 1, wherein the radiation curable material that is capable of being cured via polymerization is selected from the group consisting of cyclohexyl acrylate, 2-ethoxy ethyl acrylate, 2-methoxy ethyl acrylate, 2(2-ethoxyethoxy) ethyl acrylate, stearyl acrylate, tetrahydrofurfuryl acrylate, octyl acrylate, lauryl acrylate, behenyl acrylate, 2-phenoxy ethyl acrylate, tertiary butyl acrylate, glycidyl acrylate, isodecyl acrylate, benzyl acrylate, hexyl acrylate, isooctyl acrylate, isobomyl acrylate, butanediol monoacrylate, ethoxylated phenol monoacrylate, oxyethylated phenol acrylate, monomethoxy hexanediol acrylate, beta-carboxy ethyl acrylate, dicyclopentyl acrylate, carbonyl acrylate, octyl decyl acrylate, ethoxylated nonylphenol acrylate, hydroxyethyl acrylate, hydroxyethyl methacrylate, alkoxylated neopentyl glycol diacrylates, alkoxylated butanediol diacrylates, alkoxylated trimethylolpropane triacrylates, alkoxylated glyceryl triacrylates, alkoxylated 1,3-butylene glycol diacrylate, alkoxylated 1,4-butanediol diacrylate, alkoxylated diethylene glycol diacrylate, alkoxylated 1,6-hexanediol diacrylate, alkoxylated tetraethylene glycol diacrylate, alkoxylated triethylene glycol diacrylate, alkoxylated tripropylene glycol diacrylate, alkoxylated polybutanediol diacrylate, alkoxylated polyethylene glycol diacrylate, alkoxylated propoxylated neopentyl glycol diacrylate, alkoxylated ethoxylated neopentyl glycol diacrylate, alkoxylated polybutadiene diacrylate, and mixtures thereof.

7. The composition of claim 1, further comprising at least one additive selected from the group consisting of surfactants, light stabilizers, UV absorbers, optical brighteners, thixotropic agents, dewetting agents, slip agents, foaming agents, antifoaming agents, flow agents, oils, plasticizers, binders, electrical conductive agents, fungicides, bactericides, organic and inorganic filler particles, leveling agents, opacifiers, antistatic agents, dispersants, and mixtures thereof.

8. The composition of claim 1, further comprising at least one initiator that initiates polymerization of the radiation curable material.

9. The composition of claim 8, wherein the initiator is selected from the group consisting of ketones, benzoins, benzoin alkyl ethers, acyl phosphine oxides, metallocenes, benzophenones, trimethylbenzoylphenylphosphine oxides, azo compounds, anthraquinones and substituted anthraquinones, other substituted or unsubstituted polynuclear quinines, acetophenones, thioxanthones, ketals, acylphosphines, thioxanthenones, and mixtures thereof.

10. The composition of claim 1, further comprising an additional colorant different from said fluorescent nanoparticle composition, selected from the group consisting of pigment, dye, mixtures of pigment and dye, mixtures of pigments, and mixtures of dyes.

11. The composition of claim 1, wherein the at least one nanoscale fluorescent pigment particle and/or the at least one fluorescent organic nanoparticle have an average particle diameter, as derived from transmission electron microscopy imaging, of less than about 200 nm.

12. The composition of claim 1, wherein the at least one nanoscale fluorescent pigment particle and/or the at least one fluorescent organic nanoparticle have an average particle diameter, as derived from transmission electron microscopy imaging, of less than about 100 nm.

13. The composition of claim 1, wherein the fluorescent nanoparticle composition includes at least one nanoscale fluorescent pigment particle comprising:
    a fluorescent pigment having at least one functional moiety, and
    at least one sterically bulky stabilizer compound each having at least one functional group, wherein the functional moiety on the pigment associates non-covalently with the functional group of the stabilizer.

14. The composition of claim 1, wherein the fluorescent nanoparticle composition includes at least one fluorescent organic nanoparticle obtained by emulsion-polymerization.

15. The composition of claim 1, wherein the fluorescent nanoparticle composition includes at least one fluorescent organic nanoparticle obtained by preparing a polymer latex.

16. The composition of claim 13, wherein the at least one functional group of the sterically bulky stabilizer is selected from the group consisting of sulfonate/sulfonic acid, (thio)

carboxylate/(thio)carboxylic acid, phosphonate/phosphonic acid, ammonium and substituted ammonium salts, phosphonium and substituted phosphonium salts, substituted carbonium salts, substituted arylium salts, alkyl/aryl (thio)carboxylate esters, thiol esters, primary and secondary amides, primary and secondary amines, hydroxyl, ketone, aldehyde, oxime, hydroxylamino, enamines, porphyrins, (phthalo)cyanines, urethane, carbamate, substituted ureas, guanidines and guanidinium salts, pyridine and pyridinium salts, imidazolium and (benz)imidazolium salts, (benz)imidazolones, pyrrolo, pyrimidine and pyrimidinium salts, pyridinone, piperidine and piperidinium salts, piperazine and piperazinium salts, triazolo, tetraazolo, oxazole, oxazolines and oxazolinium salts, indoles, indenones, and mixtures thereof.

17. The composition of claim 13, wherein the sterically bulky stabilizer comprises at least one aliphatic hydrocarbon moiety.

18. The composition of claim 13, wherein the sterically bulky stabilizer is selected from the group consisting of the following compounds:

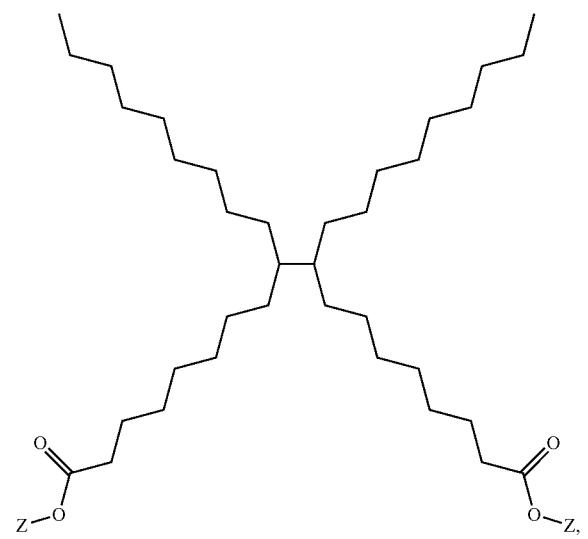

C36 Dimer Diacid
Z = H; Metal cations such as Na, K, Li, Ca, Ba, Sr, Mg, Mn, Al, Cu, B, and others;
Organic cations such as $NH_4^+$, $NR_4^+$, $PR_4^+$, and others

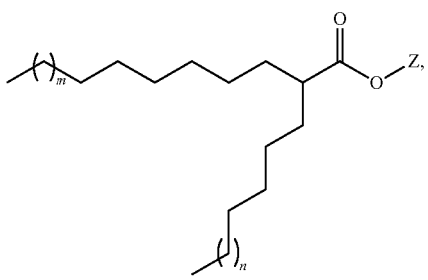

Z = H; Metal cations such as Na, K, Li, Ca, Ba, Sr, Mg, Mn, Al, Cu, B, and others;
Organic cations such as $NH_4^+$, $NR_4^+$, $PR_4^+$, and others
and methylene units (m + n) > 1

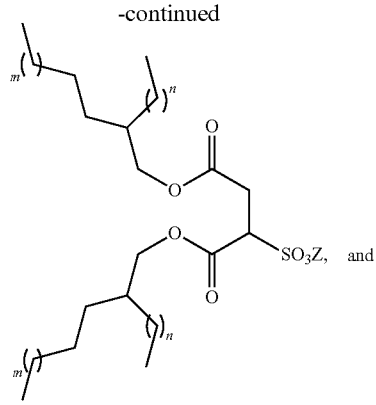

Z = H; Metal cations such Na, K, Li, Ca, Ba, Sr, Mg, Mn, Al, Cu, B and others;
Organic cations such as $NH_4^+$, $NR_4^+$, $PR_4^+$, and others
and methylene units (m + n) > 1
per branch

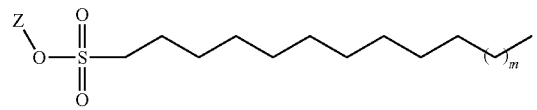

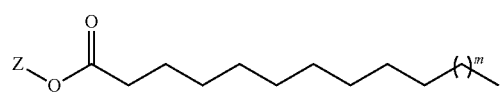

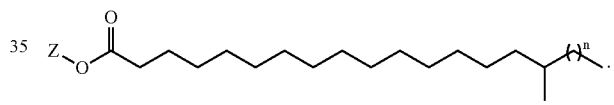

Z = H; Metal cations such as Na, K, Li, Ca, Ba, Sr, Mg, Mn, Al, Cu, B, and others;
Organic cations such as $NH_4^+$, $NR_4^+$, $PR_4^+$, and others
and methylene units m ≥ 1
and for iso-stearic acid ≤ 1

19. A radiation curable ink composition comprising:
a radiation curable material that is capable of being cured via polymerization,
a polymeric dispersant selected from the group consisting of derivatives of rosin natural products, acrylic-based polymers, styrene-based copolymers, copolymers of α-olefins, copolymers of vinyl pyridine, vinyl imidazole, vinyl pyrrolidinone, polyester copolymers, polyamide copolymers, and copolymers of vinyl acetals,
a non-fluorescent colorant including pigment, dye, mixtures of dyes, mixtures of pigments, mixtures of dyes and pigments, and the like, and
a fluorescent nanoparticle composition, wherein the fluorescent nanoparticle composition comprises a fluorescent organic nanoparticle obtained by preparing a polymer latex.

20. A radiation curable ink composition comprising:
a radiation curable material that is capable of being cured via polymerization,
a polymeric dispersant selected from the group consisting of derivatives of rosin natural products, acrylic-based polymers, styrene-based copolymers, copolymers ofα-olefins, copolymers of vinyl pyridine, vinyl imidazole, vinyl pyrrolidinone, polyester copolymers, polyimide copolymers, and copolymers of vinyl acetals, an optional non-fluorescent colorant including pigment, dye, mixtures of dyes, mixtures of pigments, mixtures of dyes and pigments, and the like, and a fluorescent nanoparticle composition, wherein the fluorescent nanoparticle composition comprises a fluorescent organic nanoparticle obtained by emulsion-polymerization.

21. The composition of claim 13, wherein the fluorescent pigment having at least one functional moiety is benzothioxanthene.

* * * * *